(12) United States Patent
Lim

(10) Patent No.: US 11,797,129 B2
(45) Date of Patent: Oct. 24, 2023

(54) DISPLAY DEVICE AND DRIVING METHOD THEREOF

(71) Applicant: SAMSUNG DISPLAY CO., LTD., Yongin-si (KR)

(72) Inventor: Sang Hyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/443,547

(22) Filed: Jul. 27, 2021

(65) Prior Publication Data

US 2022/0206662 A1 Jun. 30, 2022

(30) Foreign Application Priority Data

Dec. 28, 2020 (KR) .................... 10-2020-0185159

(51) Int. Cl.
*G09G 3/20* (2006.01)
*G06F 3/041* (2006.01)
(Continued)

(52) U.S. Cl.
CPC ...... *G06F 3/04184* (2019.05); *G06F 3/03545* (2013.01); *G06F 3/0441* (2019.05); *G06F 3/0442* (2019.05); *G06F 3/04162* (2019.05); *G09G 3/20* (2013.01); *G06F 2203/04108* (2013.01); *G09G 2300/0842* (2013.01); *G09G 2310/08* (2013.01)

(58) Field of Classification Search
CPC .... G06F 3/0412; G06F 3/0416; G06F 3/0443; G06F 3/04166; G06F 3/04184; G06F 3/044; G06F 3/0445; G06F 3/03545; G06F 3/04162; G06F 3/041; G06F 3/0442; G06F 2203/04104; G06F 2203/04106; G06F 2203/04114; G06F 3/0446; G06F 3/0441; G06F 3/04186; G09G 3/20; G09G 2354/00; G09G 2310/08; G09G 5/12; G02F 1/13338

See application file for complete search history.

(56) References Cited

U.S. PATENT DOCUMENTS 10,761,619 B2 9/2020 Park
10,768,719 B2 9/2020 Ju et al.
(Continued)

FOREIGN PATENT DOCUMENTS

KR 10-2018-0079586 7/2018
KR 10-2019-0081539 7/2019
KR 10-2020-0076941 6/2020

*Primary Examiner* — Dismery Mercedes
(74) *Attorney, Agent, or Firm* — F. CHAU & ASSOCIATES, LLC

(57) ABSTRACT

A display device includes: a display unit that displays an image during a plurality of frames; and a sensor unit that overlaps the display unit, where the sensor unit includes a plurality of sensors. During a first period of an Nth frame of the plurality of frames, the plurality of sensors transmit a first signal. During a second period of the Nth frame, the plurality of sensors transmit a second signal. During a third period of an (N+1)th frame of the plurality of frames, the plurality of sensors transmit a third signal. During a fourth period of the (N+1)th frame, the plurality of sensors transmit a fourth signal. The first signal and the third signal have phases opposite to each other.

16 Claims, 18 Drawing Sheets

(51) Int. Cl.
*G06F 3/0354* (2013.01)
*G06F 3/044* (2006.01)

(56) References Cited

U.S. PATENT DOCUMENTS

| | | | |
|---|---|---|---|
| 10,877,578 B2* | 12/2020 | Hisano | G06F 3/0441 |
| 11,275,464 B2* | 3/2022 | Jang | G06F 3/0412 |
| 2018/0024658 A1* | 1/2018 | Yamamoto | G06F 3/044 |
| | | | 345/179 |
| 2019/0179475 A1* | 6/2019 | Seo | G06F 3/0442 |
| 2019/0294310 A1* | 9/2019 | Lee | G06F 3/04184 |
| 2020/0073530 A1 | 3/2020 | Kim et al. | |
| 2020/0201480 A1* | 6/2020 | Choi | G06F 3/04162 |
| 2020/0401293 A1* | 12/2020 | Wang | G06F 3/04162 |
| 2021/0191590 A1* | 6/2021 | Jang | G06F 3/04162 |
| 2021/0200356 A1* | 7/2021 | Chung | G06F 3/041661 |
| 2021/0345361 A1* | 11/2021 | Hisano | H04L 5/0053 |
| 2021/0397297 A1* | 12/2021 | Ding | G06F 3/0443 |

* cited by examiner

DISPLAY DEVICE AND DRIVING METHOD THEREOF

CROSS-REFERENCE TO RELATED APPLICATION

The present application claims priority under 35 U.S.C. § 119(a) from Korean patent application 10-2020-0185159, filed on Dec. 28, 2020 in the Korean Intellectual Property Office, the contents of which are herein incorporated by reference in their entirety.

TECHNICAL FIELD

Embodiments of the present disclosure are directed to a display device and a driving method thereof, and more particularly, to a display device and a driving method thereof that can prevent display quality deterioration that may occur in a display panel.

DISCUSSION OF THE RELATED ART

A display device displays information to a user. Examples of a display device include a liquid crystal display device, an organic light emitting display device, etc.

A display device typically includes a pixel unit that displays an image and a sensing unit that senses a user's input. The sensing unit may overlap the pixel unit.

The user's input may be provided by an electronic device such as an active pen, in addition to a touch. The display device periodically transmits an uplink signal to communicate with the active pen.

However, the uplink signal may cause interference with signals that display an image on the display device, and therefore, the quality of a display panel may deteriorate.

SUMMARY

Embodiments provide a display device and a driving method thereof that can prevent display quality deterioration due to transmission of an uplink signal.

In accordance with an embodiment of the present disclosure, there is provided a display device, Including: a display unit that displays an image during a plurality of frames; and a sensor unit that overlaps the display unit, where the sensor unit includes a plurality of sensors. During a first period of an Nth frame of the plurality of frames, the plurality of sensors transmit a first signal During a second period of the Nth frame, the plurality of sensors transmit a second signal. During a third period of an (N+1)th frame of the plurality of frames, the plurality of sensors transmit a third signal. During a fourth period of the (N+1)th frame, the plurality of sensors transmit a fourth signal. The first signal and the third signal have phases opposite to each other.

The first signal may be an Nth uplink signal, and the second signal may be an (N−1)th inverted signal. The third signal may be an Nth inverted signal, and the fourth signal may be an (N+1)th uplink signal.

The first period may start when an ith horizontal synchronization signal is received in the Nth frame, where i is a natural number. The third period may start when an ith horizontal synchronization signal is received in the (N+1)th frame. The second period may started when a jth horizontal synchronization signal is received in the Nth frame, where j is a natural number greater than i. The fourth period may start when an jth horizontal synchronization signal is received in the (N+1)th frame.

At least some of the plurality of sensors may receive an acknowledge signal with respect to the first signal during a fifth period between the first period and the second period, receive a position signal with respect to the first signal during a sixth period between the first period and the second period, and receive a data signal with respect to the first signal during a seventh period between the first period and the second period. The sixth period may come after the fifth period, and the seventh period may come after the sixth period.

At least some of the plurality of sensors may receive an acknowledge signal with respect to the fourth signal during an eighth period after the fourth period, receive a position signal with respect to the fourth signal during a ninth period after the fourth period, and receive a data signal with respect to the fourth signal during a tenth period after the fourth period. The ninth period may come after the eight period, and the tenth period may come after the ninth period.

At least some of the plurality of sensors may receive an acknowledge signal with respect to the first signal during a fifth period between the first period and the second period, receive a position signal with respect to the first signal during a sixth period after the second period, and receive a data signal with respect to the first signal during a seventh period after the second period. The seventh period may come after the sixth period.

At least some of the plurality of sensors may receive an acknowledge signal with respect to the fourth signal during an eighth period after the fourth period, receive a position signal with respect to the fourth signal during a ninth period after the fourth period, and receive a data signal with respect to the fourth signal during a tenth period after the fourth period. The ninth period may come after the eighth period, and the tenth period may come after the ninth period.

At least some of the plurality of sensors may receive an acknowledge signal with respect to the first signal during a fifth period after the second period, receive a position signal with respect to the first signal during a sixth period after the second period, and receive a data signal with respect to the first signal during a seventh period after the second period. The sixth period may come after the fifth period, and the seventh period may come after the sixth period.

At least some of the plurality of sensors may receive an acknowledge signal with respect to the fourth signal during an eighth period after the fourth period, receive a position signal with respect to the fourth signal during a ninth period after the fourth period, and receive a data signal with respect to the fourth signal during a tenth period after the fourth period. The ninth period may come after the eighth period, and the tenth period may come after the ninth period.

At least some of the plurality of sensors may receive a position signal with respect to the first signal between the first period and the second period, and receive a position signal with respect to the fourth signal after the fourth period. The first signal and the fourth signal may be the same.

In accordance with an embodiment of the present disclosure, there is provided a method for driving a display device, the method including: transmitting, by a sensor unit, a first signal during a first period of an Nth frame of a plurality of frames in which an image is displayed by a display unit; transmitting, by the sensor unit, a second signal during a second period of the Nth frame; transmitting, by the sensor unit, a third signal during a third period of an (N+1)th frame of the plurality of frames; and transmitting, by the sensor unit, a fourth signal during a fourth period of the (N+1)th frame. The first signal and the third signal have phases opposite to each other.

The first signal may be an Nth uplink signal, and the second signal may be an (N−1)th inverted signal. The third signal may be an Nth inverted signal, and the fourth signal may be an (N+1)th uplink signal.

The first period may start when an ith horizontal synchronization signal is received in the Nth frame, where i is a natural number. The third period may start when an ith horizontal synchronization signal is received in the (N+1)th frame. The second period may start when a jth horizontal synchronization signal is received in the Nth frame, where j is a natural number greater than i. The fourth period may start when an jth horizontal synchronization signal is received in the (N+1)th frame.

Transmitting the first signal during the first period of the Nth frame may further include: receiving an acknowledge signal with respect to the first signal during a fifth period between the first period and the second period; receiving a position signal with respect to the first signal during a sixth period between the first period and the second period; and receiving a data signal with respect to the first signal during a seventh period between the first period and the second period. The sixth period may come after the fifth period, and the seventh period may come after the sixth period.

Transmitting the fourth signal during the fourth period of the (N+1)th frame may further include: receiving an acknowledge signal with respect to the fourth signal during an eighth period after the fourth period; receiving a position signal with respect to the fourth signal during a ninth period after the fourth period; and receiving a data signal with respect to the fourth signal during a tenth period after the fourth period. The ninth period may come after the eight period, and the tenth period may come after the ninth period.

Transmitting the first signal during the first period of the Nth frame may further include receiving an acknowledge signal with respect to the first signal during a fifth period between the first period and the second period. Transmitting the second signal during the second period of the Nth frame may further include: receiving a position signal with respect to the first signal during a sixth period after the second period; and receiving a data signal with respect to the first signal during a seventh period after the second period. The seventh period may come after the sixth period.

Transmitting the fourth signal during the fourth period of the (N+1)th frame may further include: receiving an acknowledge signal with respect to the fourth signal during an eighth period after the fourth period; receiving a position signal with respect to the fourth signal during a ninth period after the fourth period; and receiving a data signal with respect to the fourth signal during a tenth period after the fourth period. The ninth period may come after the eighth period, and the tenth period may come after the ninth period.

Transmitting the second signal during the second period of the Nth frame may further include: receiving an acknowledge signal with respect to the first signal during a fifth period after the second period; receiving a position signal with respect to the first signal during a sixth period after the second period; and receiving a data signal with respect to the first signal during a seventh period after the second period. The sixth period may come after the fifth period, and the seventh period may come after the sixth period.

Transmitting of the fourth signal during the fourth period of the (N+1)th frame may further include: receiving an acknowledge signal with respect to the fourth signal during an eighth period after the fourth period; receiving a position signal with respect to the fourth signal during a ninth period after the fourth period; and receiving a data signal with respect to the fourth signal during a tenth period after the fourth period. The ninth period may come after the eighth period, and the tenth period may come after the ninth period.

Transmitting the first signal during the first period of the Nth frame may further include receiving a position signal with respect to the first signal between the first period and the second period. Transmitting the fourth signal during the fourth period of the (N+1)th frame may further include receiving a position signal with respect to the fourth signal after the fourth period. The first signal and the fourth signal may be the same.

DETAILED DESCRIPTION

Figure 1:
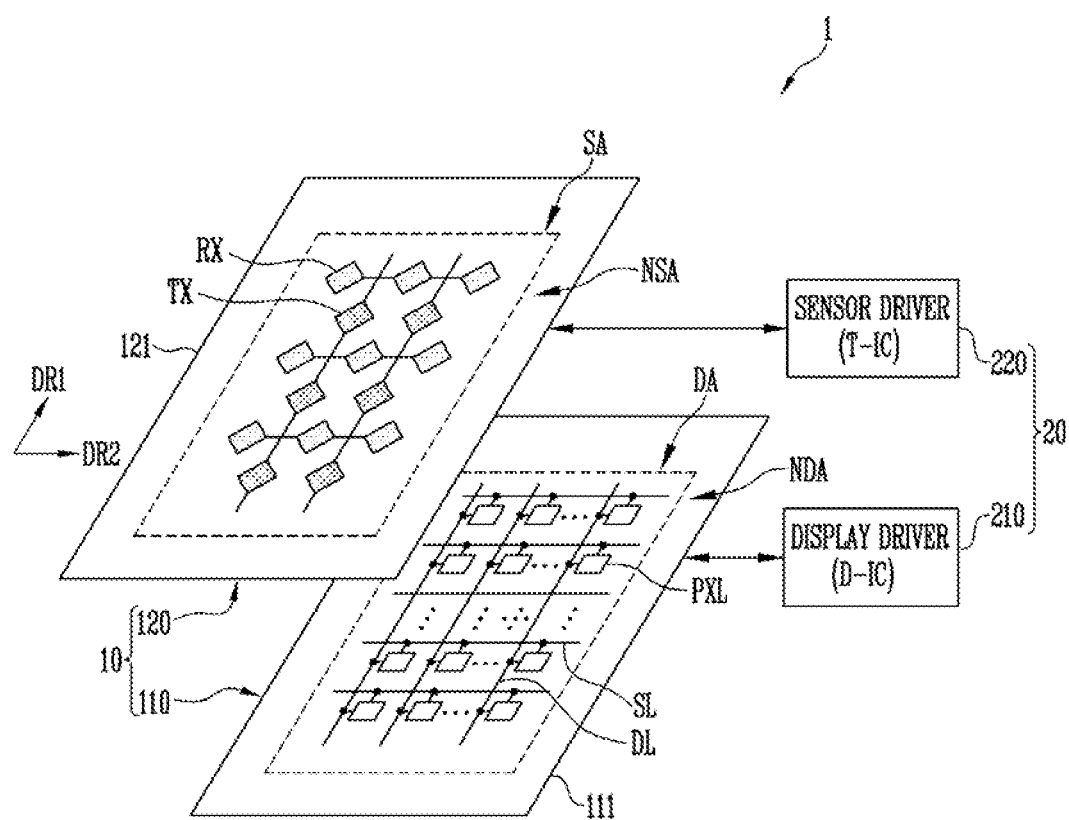
FIG. 1 illustrates a display device in accordance with an embodiment of the present disclosure.

Hereinafter, embodiments will be described in detail with reference to the accompanying drawings. The effects and characteristics of embodiments of the present disclosure and a method of achieving the effects and characteristics will be clear by referring to the embodiments described below in detail together with the accompanying drawings. However, embodiments of the present disclosure are not limited to the embodiments disclosed herein but may be implemented in various forms. The embodiments are provided by way of example only so that a person of ordinary skilled in the art can fully understand the features in the present disclosure and the scope thereof. Therefore, embodiments of the present disclosure can be defined by the scope of the appended claims. Like reference numerals may generally denote like elements throughout the specification.

Hereinafter, a display device in accordance with an embodiment of the present disclosure will be described with reference to FIG. 1.

FIG. 1 illustrates a display device in accordance with an embodiment of the present disclosure.

A display device 1 in accordance with the embodiment of the present disclosure includes a panel 10 and a driving circuit 20.

The panel 10 includes a display unit 110 and a sensor unit 120.

The display unit 110 includes a display substrate 111 and a plurality of pixels PXL formed on the display substrate 111. The plurality of pixels PXL are disposed in a display area DA of the display substrate 111. The plurality of pixels PXL display an image on the panel 10.

The display substrate 111 includes the display area DA in which an image is displayed and a non-display area NDA that surrounds the display area DA. The display area DA is disposed in a central area of the display unit 110, and the non-display area NDA is disposed in an edge area of the display unit 110 and surrounds the display area DA.

In addition, the display substrate 111 may be a rigid substrate or a flexible substrate, and the materials or properties of the display substrate 111 are not particularly limited. For example, in an embodiment, the display substrate 111 is a rigid substrate made of glass or tempered glass, or in another embodiment, a flexible substrate configured with a thin film made of plastic or metal.

A plurality of scan lines SL and a plurality of data lines DL are disposed in the display area DA, and the plurality of pixels PXL are connected to the plurality of scan lines SL and the plurality of data lines DL.

A pixel PXL is selected by a turn-on level scan signal, which is received from one of the plurality of scan lines SL. In addition, the selected pixel PXL is supplied with a data voltage received from one of the plurality of data lines DL. The selected pixel PXL emits light with a luminance that corresponds to the supplied data voltage. Accordingly, an image that corresponds to the data voltages is displayed in the display area DA.

According to embodiments, various types of lines and/or a built-in circuit, connected to the plurality of pixels PXL of the display area DA, are disposed in the non-display area NDA.

Specifically, in an embodiment, a plurality of lines that supply various power signals and various control signals to the display area DA are disposed in the non-display area NDA. In addition, a scan driver, etc., is further disposed in the non-display area NDA.

In the present disclosure, the type of the display unit 110 is not particularly limited. For example, in some embodiments, the display unit 110 is a self-luminescent display panel such as an organic light emitting display panel (OLED panel) that uses an organic light emitting diode as a light emitting element, a nano/micro-scale light emitting diode display panel (Nano/Micro LED panel) that uses a nanometer to micrometer size light emitting diode as a light emitting element, but is not limited thereto, a quantum dot organic light emitting display panel (QD OLED panel) that uses an organic light emitting diode and a quantum dot, or a nano/micro-scale quantum dot LED display panel (QD Nano/Micro LED panel) that uses a nanometer to micrometer size light emitting diode and a quantum dot. Alternatively, in some embodiments, the display unit 110 is a non-self-luminescent display panel such as a liquid crystal display panel (LCD panel), an electro-phoretic display panel (EPD panel), or an electro-wetting display panel (EWD panel). When the display unit 110 is implemented as a non-self-luminescent display panel, the display device 1 additionally includes a light source such as a back-light unit.

The sensor unit 120 senses a touch, a pressure, a fingerprint, a hovering, an active pen, etc., applied to the display unit 110. In an embodiment, the sensor unit 120 overlaps the display unit 110.

Specifically, in an embodiment, when the display unit 110 and the sensor unit 120 are separately manufactured from each other, the display unit 110 and the sensor unit 120 are disposed and/or coupled to overlap with each other in at least one area.

For example, in an embodiment, the sensor unit 120 is formed directly on at least one substrate, such as an upper substrate and/or a lower substrate of a display panel, or a thin film encapsulation layer, or another insulating layer or one of various types of functional layers that constitute the display unit 110.

However, although a case in which the sensor unit 120 is disposed on a front surface, such as an upper surface on which an image is displayed, of the display unit 110 is illustrated in FIG. 1, the position of the sensor unit 120 is not limited thereto in other embodiments.

For example, in embodiments, the sensor unit 120 is disposed on a rear surface or on both surfaces of the display unit 110. Alternatively, in an embodiment, the sensor unit 120 is disposed in at least one edge area of the display unit 110.

In an embodiment, the sensor unit 120 includes a sensor substrate 121 and a plurality of sensors TX and RX formed on the sensor substrate 121. The plurality of sensors TX and RX are disposed in a sensing area SA on the sensor substrate 121.

In an embodiment, the sensor substrate 121 includes the sensing area SA and a peripheral area NSA at the periphery of the sensing area SA.

The sensor substrate 121 may be a rigid or flexible substrate. In an embodiment, the sensor substrate 121 includes at least one insulating layer. In addition, the sensor substrate 121 may be a transparent or translucent light transmission substrate. However, in other embodiments, the materials and properties of the sensor substrate 121 are not limited thereto.

The sensing area SA includes active areas of the sensors that can react with a user input. To react with a user's input, sensors TX and RX that sense the user's input, etc. are disposed in the sensing area SA.

Hereinafter, TX is referred to as a first sensor, and RX is referred to as a second sensor.

Specifically, in an embodiment, first sensors TX extend in a first direction DR1, and second sensors RX are disposed to extend in a second direction DR2 that crosses the first direction DR1. The first direction DR1 and the second direction DR2 are orthogonal to each other.

Specifically, in an embodiment, the first sensors TX include first cells that have a relatively wide area and first bridges that have a relatively narrow area that are connected to each other.

Although FIG. 1 illustrates an embodiment in which the first cells have a diamond shape, embodiments are not limited thereto, and in other embodiments, the first cells can have various other shapes, such as a circular shape, a rectangular shape, a triangular shape, or a mesh shape, etc.

In addition, in an embodiment, the second sensors RX include second cells that have a relatively wide area and second bridges that have a relatively narrow area and that are connected to each other.

Although FIG. 1 illustrates an embodiment in which the second cells have a diamond shape, like the first cells, embodiments are not limited thereto, and in other embodiments, the second cells can have various other shapes, such as a circular shape, a rectangular shape, a triangular shape, or a mesh shape, etc.

In addition, in an embodiment, each of the first sensors TX and the second sensors RX includes at least one of a metal, a transparent conductive material, or various other conductive materials, to be conductive.

Specifically, in an embodiment, the first sensors TX and the second sensors RX include at least one of various metals, such as gold (Au), silver (Ag), aluminum (Al), molybdenum (Mo), chromium (Cr), titanium (Ti), nickel (NI), neodymium (Nd), copper (Cu), or platinum (Pt), and the like, or alloys thereof. The first sensors TX and the second sensors RX are configured in a mash shape.

In addition, in an embodiment, the first sensors TX and the second sensors RX include at least one of various transparent conductive materials, such as silver nano wire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, or graphene, etc.

In an embodiment, sensing area SA overlaps at least one area of the display area DA.

Specifically, in an embodiment, the sensing area SA corresponds to the display area DA, and is, e.g., an area that overlaps the display area DA, and the peripheral circuit NSA corresponds to the non-display area NDA, and is, e.g., an area that overlaps the non-display area NDA. When a touch input, etc., is provided to the display area DA, the touch input is detected through the sensor unit 120.

In an embodiment, sensor lines that electrically connect the sensors TX and RX to a sensor driver 220 are disposed in the peripheral area NSA of the sensor unit 120.

In an embodiment, the driving circuit 20 includes a display driver 210 and the sensor driver 220. The display driver 210 and the sensor driver 220 may be configured as Integrated Chips (ICs) separate from each other. Alternatively, in an embodiment, at least a portion of the display driver 210 and at least a portion of the sensor driver 220 may be integrated together in one IC.

In an embodiment, the display driver 210 is connected to the display unit 110 to drive the display unit 110. Specifically, the display driver 210 is electrically connected to the display unit 110 to drive the pixels PXL.

In an embodiment, the sensor driver 220 is connected to the sensor unit 120 to drive sensor unit 120. Specifically, the sensor driver 220 is electrically connected to the sensor unit 120 to drive the sensor unit 120.

Hereinafter, a display unit and a display driver in accordance with an embodiment of the present disclosure will be described with reference to FIG. 2.

Figure 2:
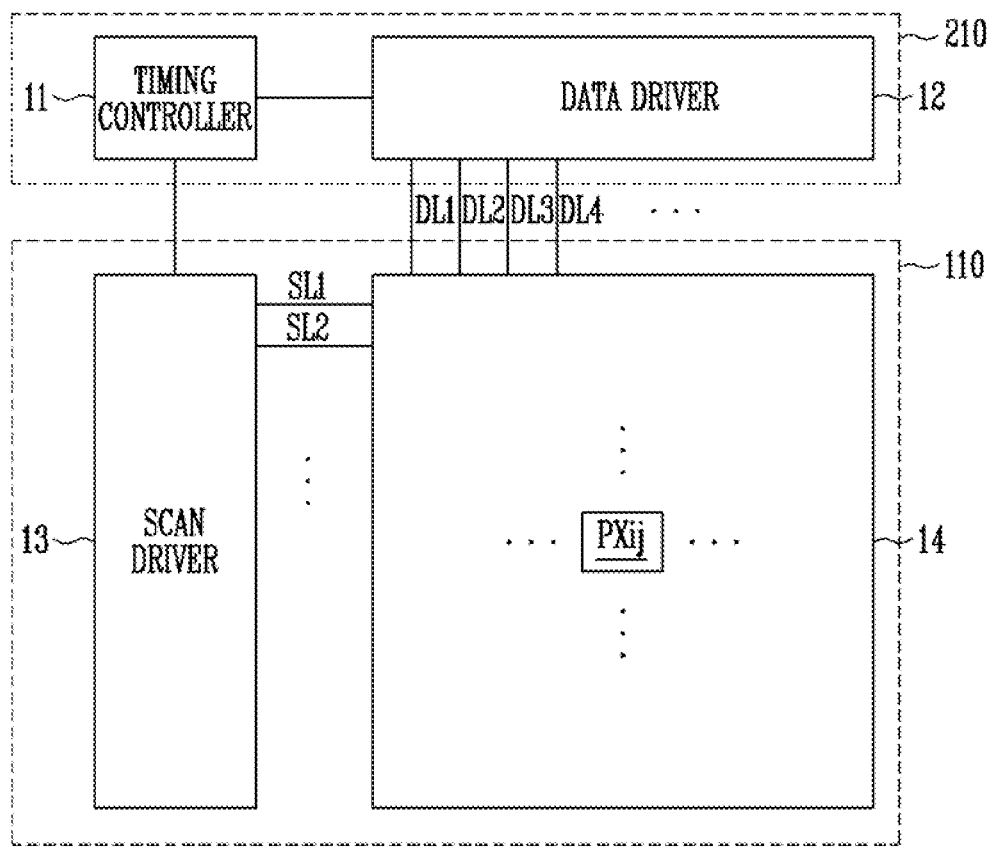
FIG. 2 illustrates a display unit and a display driver in accordance with an embodiment of the present disclosure.

FIG. 2 illustrates a display unit and a display driver in accordance with an embodiment of the present disclosure.

The display driver 210 includes a timing controller 11 and a data driver 12.

In an embodiment, the timing controller 11 receives grayscales for each frame and control signals from a processor. The processor may correspond to a Graphics Processing Unit (GPU), a Central Processing Unit (CPU), or an Application Processor (AP), etc. The control signals include a vertical synchronization signal, a horizontal synchronization signal, a data enable signal, etc.

In an embodiment, each cycle of the vertical synchronization signal corresponds to each display frame period. Specifically, when the vertical synchronization signal has a logic high level, the vertical synchronization signal indicates an active period of a corresponding display frame period. When the vertical synchronization signal has a logic low level, the vertical synchronization signal indicates a blank period of a corresponding display frame period.

In an embodiment, each cycle of the horizontal synchronization signal corresponds to each horizontal period.

In an embodiment, the data enable signal has an enable level, such as a logic high level, when grayscales are received from the processor, and have a disable level, such as a logic low level, when the grayscales are not received.

In addition, in an embodiment, the timing controller 11 renders grayscales to correspond to the specifications of the display device 1.

In an embodiment, the processor provides a red grayscale, a green grayscale, and a blue grayscale with respect to each unit dot. The timing controller 11 renders grayscales that correspond to an arrangement of pixels PXij in a pixel unit 14, and provides the rendered grayscales to the data driver 12.

In addition, in an embodiment, the timing controller 11 provides a data control signal to the data driver 12. The timing controller 11 also provides a scan control signal to a scan driver 13.

In an embodiment, the data driver 12 generates data signals to be provided to data lines DL1, DL2, DL3, DL4, . . . by using the grayscales and the data control signal that are received from the timing controller 11.

In an embodiment, the display unit 110 includes the scan driver 13 and the pixel unit 14.

In an embodiment, the scan driver 13 generates scan signals that have a pulse of a turn-on level to be provided to scan lines SL1, SL2, . . . by using a clock signal, a scan start signal, etc., which are received from the timing controller 11. The scan driver 13 sequentially supplies the generated scan signals to the scan lines SL1, SL2, . . . .

Specifically, in an embodiment, the scan driver 13 supplies the turn-on level scan signals to the scan lines in a period that corresponds to the cycle of the horizontal synchronization signal.

In an embodiment, the scan driver 13 includes a plurality of scan stages configured as shift registers. The scan driver 13 generates the scan signals by sequentially transmitting the scan start signal in the form of a turn-on level pulse to a next scan stage under the control of the clock signal.

In an embodiment, the pixel unit 14 includes pixels PXIj. Each of the pixels is connected to a corresponding data line and a corresponding scan line.

Specifically, in an embodiment, the pixel PXij is connected to an ith scan line and a jth data line. The pixels include sub-pixels that emit a first color light, sub-pixels that emit a second color light, and sub-pixels that emit a third color light. The first color, the second color, and the third color may be different colors.

Specifically, in an embodiment, the first color is one of red, green, or blue, the second color is one of, except for the first color, red, green, or blue, and the third color is the other of red, green, and blue except for the first color and the second color. Alternatively, in other embodiments, the first to third colors are magenta, cyan, and yellow instead of red, green, and blue. However, for convenience of description, an embodiment in which the first color, the second color, and the third color are red, green, and blue, respectively, is described.

Hereinafter, a pixel in accordance with an embodiment of the present disclosure will be described with reference to FIG. 3.

Figure 3:
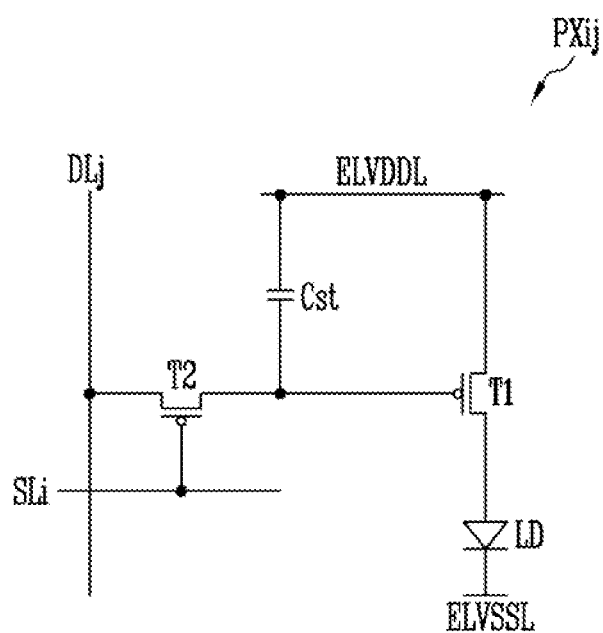
FIG. 3 is a circuit diagram of a pixel in accordance with an embodiment of the present disclosure.

FIG. 3 is a circuit diagram of a pixel in accordance with an embodiment of the present disclosure.

In an embodiment, the pixel PXij includes transistors T1 and T2, a storage capacitor Cst, and a light emitting diode LD.

In an embodiment, a gate electrode of a transistor T1 is connected to a second electrode of a storage capacitor Cst, and a first electrode of the transistor T1 is connected to a first power line ELVDDL. In addition, a second electrode of the transistor T1 is connected to an anode of a light emitting diode LD. Hereinafter, the transistor T1 is referred to as a driving transistor.

In an embodiment, a gate electrode of a transistor T2 is connected to an ith scan line SL, and a first electrode of the transistor T2 is connected to a jth data line DLj. In addition, a second electrode of the transistor T2 is connected to the second electrode of the storage capacitor Cst. Hereinafter, the transistor T2 is referred to as a scan transistor.

In an embodiment, the transistors T1 and T2 are implemented with a P-type transistor, but embodiments are not limited thereto, and those skilled in the art may use at least one N-type transistor by reversing the phase of a signal.

In an embodiment, a first electrode of the storage capacitor Cst is connected to the first power line ELVDDL, and the second electrode of the storage capacitor Cst is connected to the gate electrode of the transistor T1.

In an embodiment, the anode of the light emitting diode LD is connected to the second electrode of the transistor T1, and a cathode of the light emitting diode LD is connected to a second power line ELVSSL. During an emission period of the light emitting diode LD, a first power voltage applied to the first power line ELVDDL is higher than a second power voltage of the second power line ELVSSL.

In an embodiment, when a turn-on level scan signal is applied to the ith scan line SLi, the transistor T2 is turned on. A data voltage charged in the jth data line DLj is stored in the second electrode of the storage capacitor Cst. The transistor T1 transmits a driving current that corresponds to a gate-source voltage difference maintained by the storage capacitor Cst. The generated driving current flows through a path from the first power line ELVDDL through the transistor T1 and the light emitting diode LD to the second power line ELVSSL. The light emitting diode LD emits light with a luminance that corresponds to a magnitude of the driving current.

Hereinafter, first sensors and second sensors in accordance with an embodiment of the present disclosure will be described with reference to FIG. 4.

Figure 4:
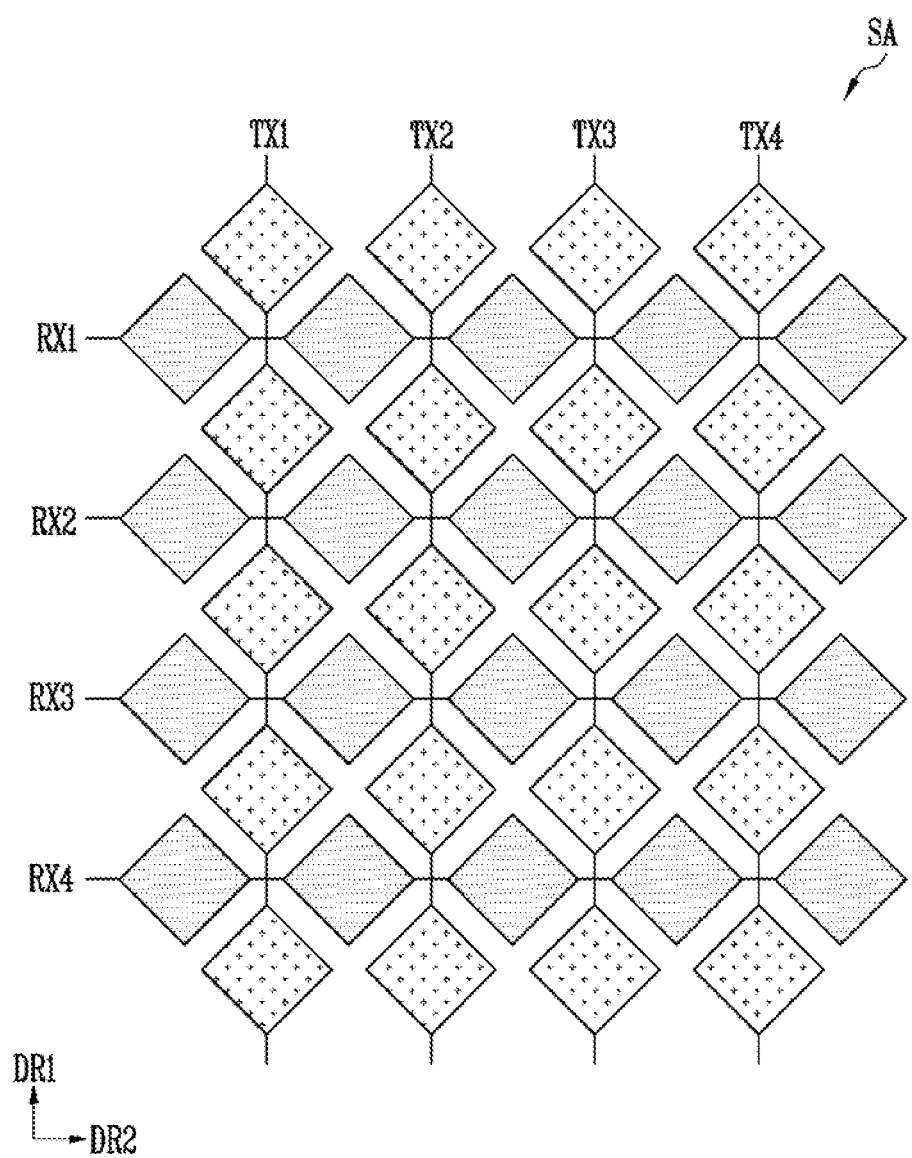
FIG. 4 illustrates first sensors and second sensors that are included in a sensor unit, in accordance with an embodiment of the present disclosure.

FIG. 4 illustrates first sensors and second sensors in the sensor unit, in accordance with an embodiment of the present disclosure.

In an embodiment, first sensors TX1, TX2, TX3, and TX4 and second sensors RX1, RX2, RX3, and RX4 are disposed in the sensing area SA of the sensor unit 120. For convenience of description, it is assumed that four first sensors TX1, TX2, TX3, and TX4 are disposed in the sensing area SA and four second sensors RX1, RX2, RX3, and RX4 are disposed in the sensing area SA. However, embodiments are not limited thereto, and the number of first and second sensors can vary in other embodiments.

Descriptions of the first sensors TX1 to TX4 and the second sensors RX1 to RX4 are identical to those of the first sensors TX and the second sensors RX that are shown in FIG. 1, and therefore, repeated descriptions will be omitted.

Hereinafter, a method for sensing a first object and a method for sensing a second object in accordance with an embodiment of the present disclosure will be described with reference to FIGS. 5 to 7.

Figure 5:
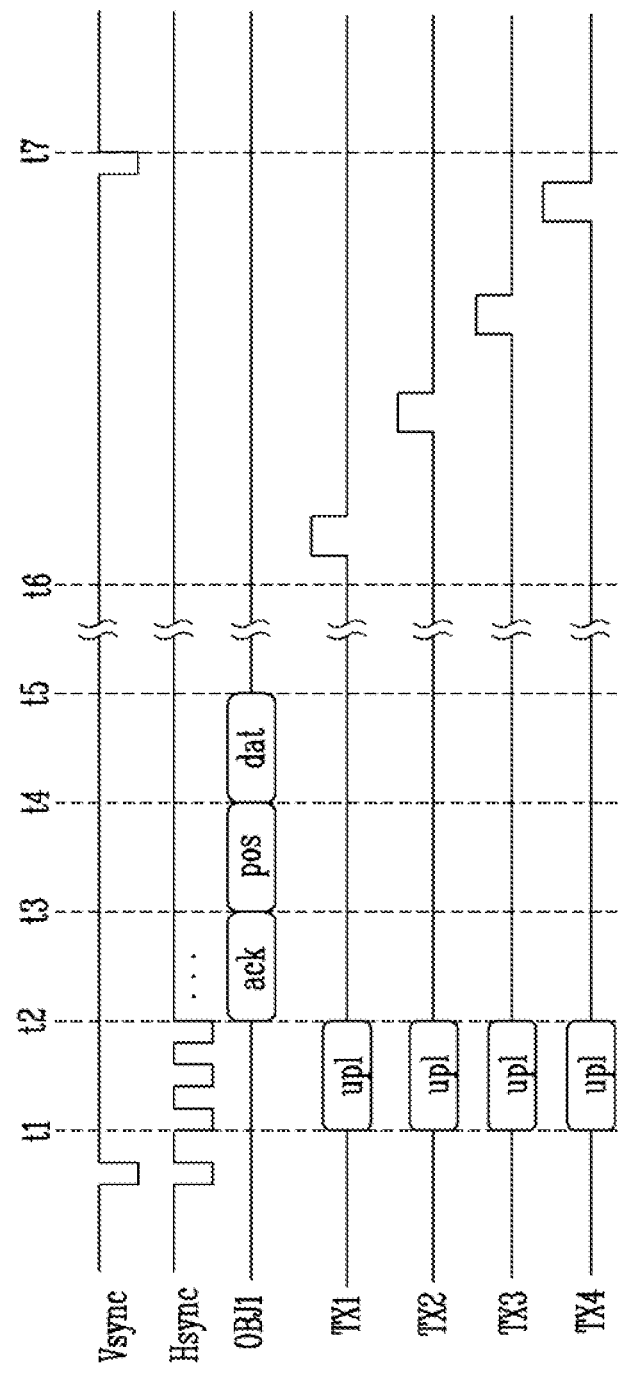
FIG. 5 illustrates a sensing period of a first object and a sensing period of a second object in accordance with an embodiment of the present disclosure.

FIG. 5 illustrates a sensing period of a first object and a sensing period of a second object in one frame period in accordance with an embodiment of the present disclosure.

Referring to FIG. 5, in an embodiment, one frame period t1 to t7 that corresponds to one cycle of the vertical synchronization signal Vsync is exemplarily illustrated. The frame period is an image display unit, i.e., a display frame period, of the display unit 110.

In an embodiment, the frame period t1 to t7 includes a first object sensing period t1 to t5 and a second object sensing period t6 to t7.

In an embodiment, the first object sensing period t1 to t5 is for sensing a first object OBJ1.

In an embodiment, the first object OBJ1 may be an active pen which transmits/receives an electromagnetic signal to/from the sensor unit 120. The first object OBJ1 may be detachable from the display device 1. In addition, the first object OBJ1 may be a product separate from the display device 1.

In addition, in an embodiment, the second object sensing period t6 to t7 is for sensing a second object OBJ2. A second object OBJ2 is a passive device that does not transmit/receive any electromagnetic signal to/from the sensor unit 120. For example, the second object OBJ2 may be a user's finger.

In an embodiment, a period t1 to t2 is for transmitting an uplink signal upl, a period t2 to t3 is for transmitting an acknowledge signal ack, a period t3 to t4 is for transmitting a position signal pos, and a period t4 to t5 for transmitting a data signal dat that constitutes a time slot. The time slot is a time unit designated for the first object OBJ1 and the sensor unit 120 to communicate with each other.

In an embodiment, uplink signal upl is synchronized with the horizontal synchronization signal Hsync in the frame period t1 to t7.

Specifically, in an embodiment, at t1 of a frame, when the horizontal synchronization signal Hsync is received, the uplink signal upl is transmitted. By doing this, noise generated due to the uplink signal upl, which will be described below, can be cancelled. This will be described in detail below.

In an embodiment, during the period t1 to t2, the first sensors TX1, TX2, TX3, and TX4 each transmits the uplink signal upl. During the period t1 to t2, the second sensors RX1 to RX4 do not transmit the uplink signal upl so as to reduce channel configuration cost and power consumption. However, in other embodiments, during the period t1 to t2, the second sensors RX1 to RX4 also transmit the uplink signal upl.

Hereinafter, for convenience of description, an embodiment is described in which only the first sensors TX1, TX2, TX3, and TX4 transmit the uplink signal upl.

In an embodiment, the uplink signal upl transmitted by the first sensors TX1, TX2, TX3, and TX4 can interfere with a data voltage through the cathode of the light emitting diode LD of the pixel PXij. Therefore, an inappropriate data voltage may be stored in a corresponding pixel PXij, and therefore, display quality deterioration may occur.

In an embodiment, during the period t2 to t3, the first object OBJ1 transmits the acknowledge signal ack that corresponds to the received uplink signal upl. The acknowledge signal ack indicates that the first object OBJ1 is located in the vicinity of the sensor unit 120.

In an embodiment, during the period t3 to t4, the first object OBJ1 transmits the position signal pos. The position signal pos has an intensity that is stronger than that of the acknowledge signal ack, or includes a greater number of pulses than the acknowledge signal ack. The position signal pos indicates a position of the first object OBJ1.

In an embodiment, during the period t4 to t5, the first object OBJ1 transmits the data signal dat. The data signal dat includes information other than the position of the first object OBJ1, such as button pressure.

Figure 6:
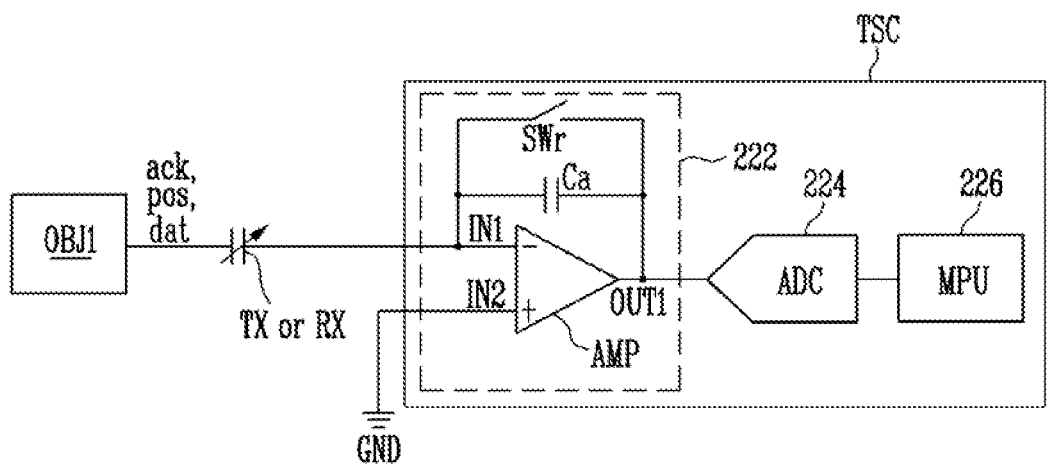
FIG. 6 illustrates a method for sensing a first object in accordance with an embodiment of the present disclosure.

FIG. 6 illustrates a method for sensing the first object OBJ1 in accordance with an embodiment of the present disclosure.

In an embodiment, the sensor driver 220 includes a sensor receiver TSC. During the first object sensing period t1 to t5, the sensor receiver TSC may be connected to the first sensors TX or the second sensors RX.

In an embodiment, the sensor receiver TSC Includes a sensor channel 222, an analog-digital converter 224, and a processor 226.

In an embodiment, the sensor channel 222 is implemented as an integrator. A capacitor Ca and a switch SWr are connected in parallel to each other between a first input terminal IN1 and an output terminal OUT1 of an operational amplifier AMP.

In an embodiment, the first input terminal IN1 of the operational amplifier AMP is connected to a corresponding sensor TX or RX, and a second input terminal IN2 of the operational amplifier AMP is connected to a reference power source GND.

Specifically, in an embodiment, the first input terminal IN1 is an inverting terminal, and the second input terminal IN2 is a non-inverting terminal. In addition, the reference power source GND is a ground voltage or a voltage having a specific magnitude.

In an embodiment, the switch SWr is turned on before the transmission signals ack, pos, and dat of the first object OBJ1 are received, so that charges of the capacitor Ca can be initialized. When the transmission signals ack, pos, and dat of the first object OBJ1 are received, the switch SWr is in a turn-off state.

In addition, in an embodiment, the sensor channel 222 generates an output signal that corresponds to a voltage difference between the first and second input terminals IN1 and IN2.

Specifically, in an embodiment, the sensor channel 222 amplifies and outputs a voltage difference between the first and second input terminals IN1 and IN2 that corresponds to a predetermined gain.

In an embodiment, the analog-digital converter 224 is connected to the output terminal OUT1 of the operational amplifier AMP. The analog-digital converter 224 converts an analog signal received from the sensor channel 222 into a digital signal.

In an embodiment, the processor 226 detects a user input by analyzing the digital signal converted by the analog-digital converter 224.

In addition, in an embodiment, at least some of the sensors TX and RX receive the position signal pos during the period t3 to t4.

Specifically, in an embodiment, a position of the first object OBJ1 in the first direction DR1 can be detected by using sensor channels 222 connected to the first sensors TX1 to TX4. In addition, a position of the second object OBJ2 in the second direction DR2 can be detected by using sensor channels 222 connected to the second sensors RX1 to RX4.

In an embodiment, when the number of sensor channels 222 is sufficient, the position of the first object OBJ1 in the first direction DR1 and the position of the second object OBJ2 in the second direction DR2 can be simultaneously detected. On the other hand, when the number of sensor channels 222 is not sufficient, the position of the first object OBJ1 in the first direction DR1 and the position of the second object OBJ2 in the second direction DR2 can be detected during different periods.

In addition, in an embodiment, at least some of the sensors TX and RX receive the data signal dat during the period t4 to t5.

In an embodiment, to reduce channel configuration cost and power consumption, only the first sensors TX are connected to the sensor channels 222 to receive the data signal dat. Alternatively, in an embodiment, only the second sensors RX are connected to the sensor channels 222 to receive the data signal dat. In other embodiments, at least some of the first sensors TX and at least some of the second sensors RX are connected to the sensor channels 222 to receive the data signal dat.

Figure 7:
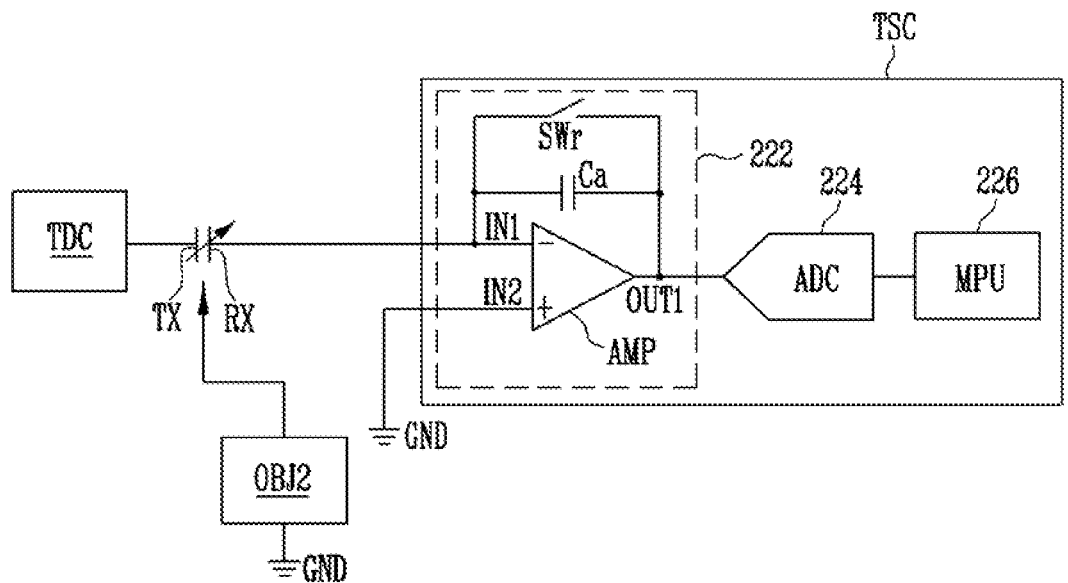
FIG. 7 illustrates a method for sensing a second object in accordance with an embodiment of the present disclosure.

FIG. 7 illustrates a method for sensing the second object OBJ2 in accordance with an embodiment of the present disclosure.

In an embodiment, the second object OBJ2 is a passive device that does not transmit/receive any electromagnetic signal to/from the sensor unit 120. For example, the second object OBJ2 may be a user's finger.

In FIG. 7, in an embodiment, the sensor driver 220 further includes a sensor transmitter TDC. During the second object sensing period t6 to t7 shown in FIG. 5, the sensor transmitter TDC is connected to the first sensors TX. In addition, the sensor receiver TSC is connected to the second sensors RX.

In an embodiment, the sensor transmitter TDC sequentially supplies sensing signals to the first sensors TX1 to TX4.

Specifically, in an embodiment, sensing signals are supplied twice, and include a rising transition and a falling transition, to first sensor TX1, sensing signals are supplied twice to first sensor TX2, sensing signals are supplied twice to first sensor TX3, and sensing signals are supplied twice to first sensor TX4. In some embodiments, more than two sensing signals are supplied to each of the first sensors TX1 to TX4.

In an embodiment, the sensor receiver TSC includes a plurality of sensor channels 222 connected to a plurality of second sensors RX. Each sensor channel 222 receives sampling signals that correspond to sensing signals from a corresponding second sensor.

Specifically, in an embodiment, the sensor channels 222 connected to the second sensors RX1 to RX4 independently receive sampling signals that correspond to the rising transition applied to the first sensor TX1. In addition, the sensor channels 222 connected to the second sensors RX1 to RX4 independently receive sampling signals that correspond to the falling transition applied to the first sensor TX1.

In an embodiment, in the sensing area SA, mutual capacitances between the first sensors TX1 to TX4 and the second sensors RX1 to RX4 differ from each other based on the position of the second object OBJ2. Accordingly, the sampling signals received by the sensor channels 222 differ from each other. The position of the second object OBJ2 is detected from a difference between the sampling signals.

Hereinafter, a method for sensing the first object in a plurality of frames in accordance with an embodiment of the present disclosure will be described with reference to FIGS. 8 to 10.

Figure 8:
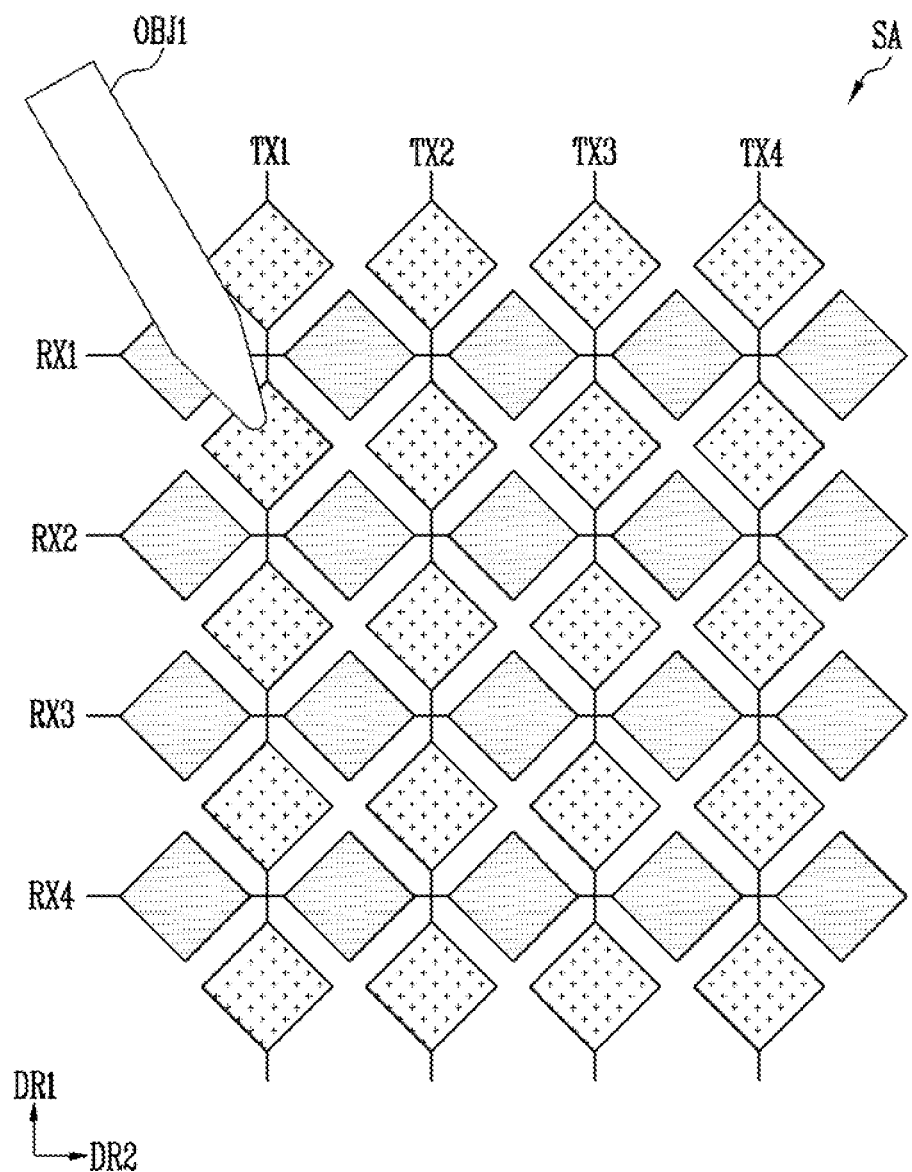
FIG. 8 illustrates a plurality of sensors in accordance with an embodiment of the present disclosure.

FIG. 8 illustrates a plurality of sensors TX and RX in accordance with an embodiment of the present disclosure.

Hereinafter, for convenience of description, it is assumed that first sensors TX transmit an uplink signal and second sensors RX do not transmit the uplink signal. However, in some embodiments, the second sensors RX transmit the uplink signal and the first sensors TX do not transmit the uplink signal. In addition, in other embodiments, at least some of the first sensors TX and at least some of the second sensors RX transmit the uplink signal.

Figure 9A:
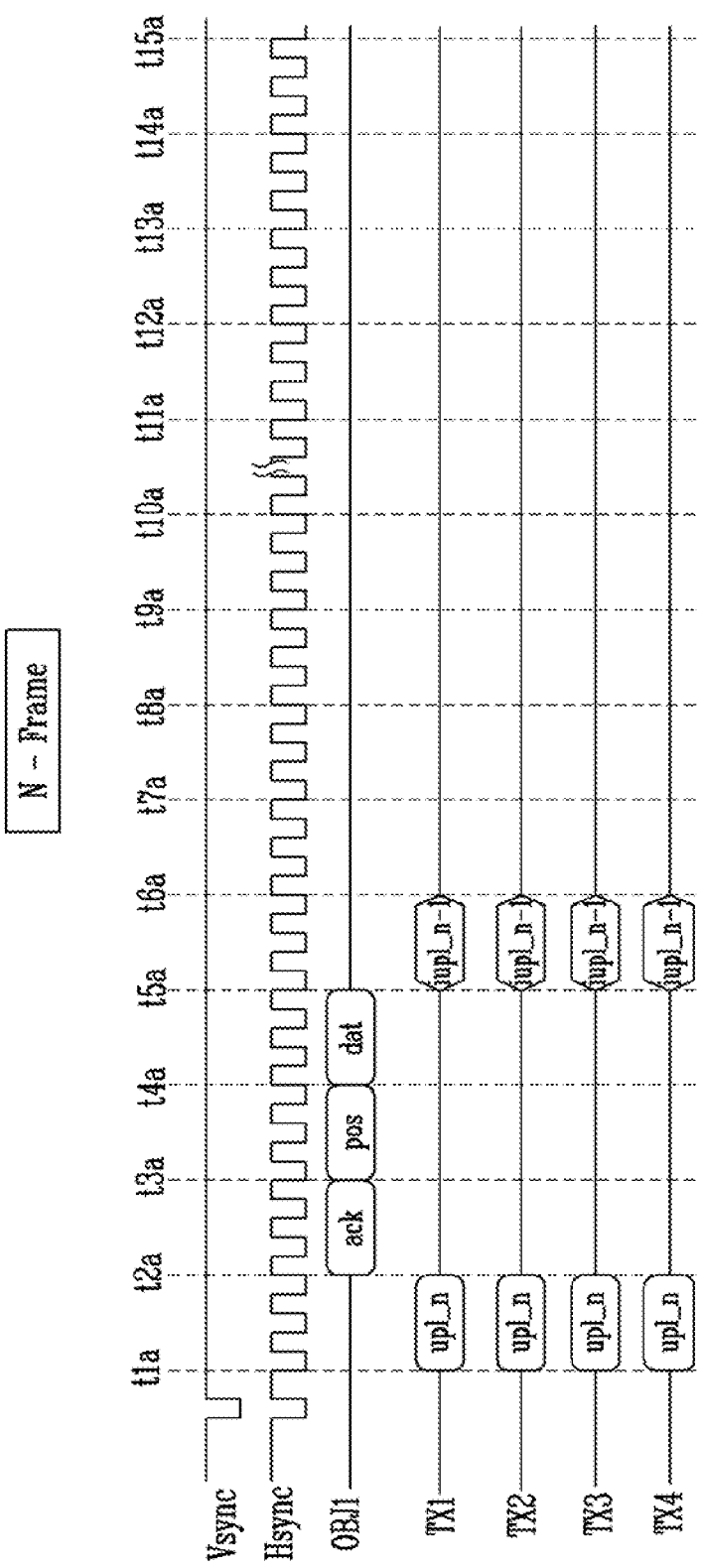
FIG. 9A illustrates a method for sensing a first object in an Nth frame in accordance with an embodiment of the present disclosure.

FIG. 9A illustrates a method for sensing the first object OBJ1 in an Nth frame in accordance with an embodiment of the present disclosure.

Referring to FIG. 9A, in an embodiment, during a first period t1a to t2a of an Nth frame N-Frame, the sensors TX1, TX2, TX3, and TX4 of the sensor unit 120 transmit an nth uplink signal upl_n.

In an embodiment, during the first period t1a to t2a of the Nth frame N-Frame, the first object OBJ1 receives the nth uplink signal upl_n. In response to the nth uplink signal upl_n, the first object OBJ1 transmits an acknowledge signal ack in a next time slot.

Therefore, in an embodiment, the sensors TX1, TX2, TX3, and TX4 receive the acknowledge signal ack with respect to the nth uplink signal upl_n during a second period t2a to t3a between the first period t1a to t2a and a fifth period t5a to t6a.

In addition, in an embodiment, the sensors TX1, TX2, TX3, and TX4 receive a position signal pos during a third period t3a to t4a between the first period t1a to t2a and the fifth period t5a to t6a.

In addition, in an embodiment, the sensors TX1, TX2, TX3, and TX4 further receive a data signal dat during a fourth period t4a to t5a between the first period t1a to t2a and the fifth period t5a to t6a.

In an embodiment, during the fifth period t5a to t6a of the Nth frame N-Frame, the sensors TX1, TX2, TX3, and TX4 of the sensor unit 120 transmits an (n−1)th uplink signal upl_n−1 of an (N−1)th frame N−1-Frame.

Figure 9B:
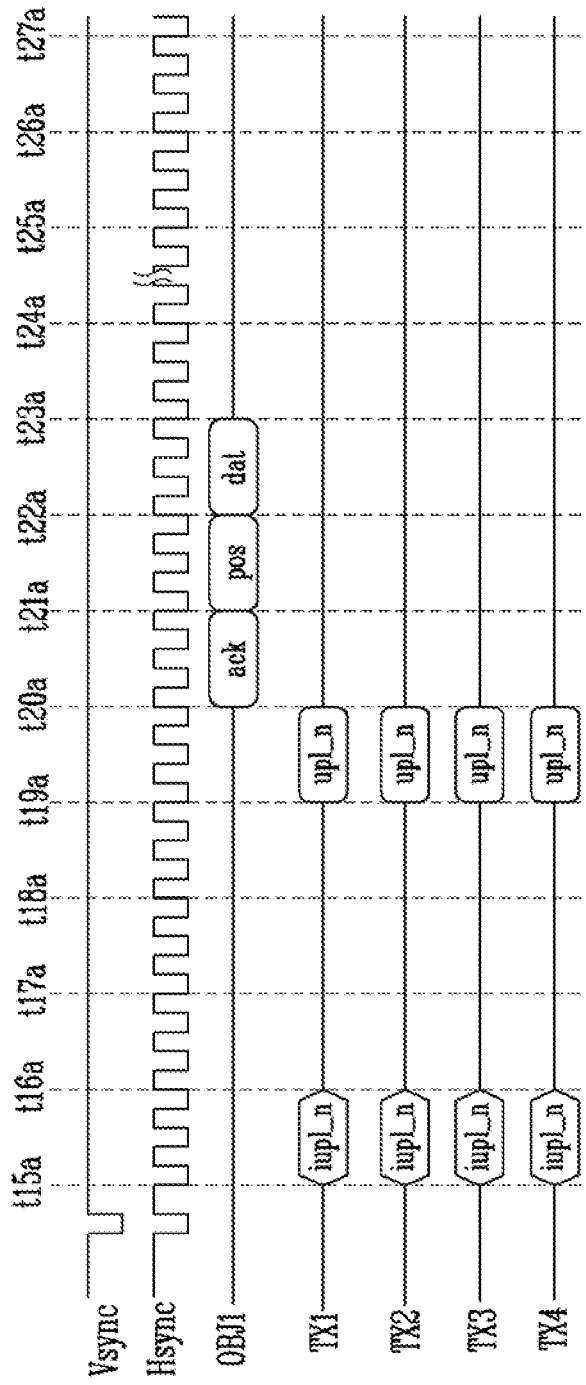
FIG. 9B illustrates a method for sensing a first object in an (N+1)th frame in accordance with an embodiment of the present disclosure.

FIG. 9B illustrates a method for sensing the first object OBJ1 in an (N+1)th frame N+1-Frame in accordance with an embodiment of the present disclosure.

Referring to FIG. 9B, in an embodiment, at t15a of the (N+1)th frame N+1-Frame, an nth inverted signal iupl_n is synchronized with an ith horizontal synchronization signal. In addition, at t19a, an (n+1)th uplink signal upl_n+1 is synchronized with a jth horizontal synchronization signal.

Referring to FIG. 9B, during a fifteenth period t15a to t16a of the (N+1)th frame N+1-Frame, the sensors TX1, TX2, TX3, and TX4 of the sensor unit 120 transmit the nth inverted signal iupl_n.

In an embodiment, the nth inverted signal iupl_n supplied to the sensors TX1, TX2, TX3, and TX4 during the fifteenth period t15a to t16a has a phase obtained by inverting the phase of the nth uplink signal upl_n supplied to the sensors TX1, TX2, TX3, and TX4 during the first period t1a to t2a of the Nth frame N-Frame.

Noise generated by the nth uplink signal upl_n supplied to the sensors during the first period of the Nth frame shown in FIG. 9A is cancelled by the nth inverted signal iupl_n supplied to the sensors during the fifteenth period shown in FIG. 9B.

In addition, in an embodiment, the first period of the Nth frame shown in FIG. 9A is synchronized with an ith horizontal synchronization signal in the Nth frame shown in FIG. 9A, and the fifteenth period of the (N+1)th frame N+1-Frame shown in FIG. 9B is synchronized with the ith horizontal synchronization signal in the (N+1)th frame N+1-Frame. The first period and the fifteenth period occur at the same time in a frame unit, and accordingly, the noise can be more stably cancelled.

Meanwhile, in an embodiment, since an inverted signal is supplied during the fifteenth period, the first object OBJ1 does not receive a signal that has an inverted phase. Therefore, the first object OBJ1 cannot receive the nth inverted signal iupl_n during the fifteenth period t15a to t16a of the (N+1)th frame N+1-Frame.

In an embodiment, during a nineteenth period t19a to t20a of the (N+1)th frame N+1-Frame, the sensor unit 120 and the sensors TX1, TX2, TX3, and TX4 transmit the (n+1)th uplink signal upl_n+1.

In an embodiment, during the nineteenth period t19a to t20a of the (N+1)th frame N+1-Frame, the first object OBJ1 receives the (n+1)th uplink signal upl_n+1. In response to the (n+1)th uplink signal upl_n+1, the first object OBJ1 transmits an acknowledge signal ack in a next time slot.

Therefore, in an embodiment, the sensors TX1, TX2, TX3, and TX4 receive the acknowledge signal ack with respect to the (n+1)th uplink signal upl_n+1 during an twentieth period t20a to t21a.

In addition, in an embodiment, the sensors TX1, TX2, TX3, and TX4 further receive a position signal pos during a twenty-first period t21a to t22a.

In addition, in an embodiment, the sensors TX1, TX2, TX3, and TX4 further receive a data signal dat during a twenty-second period t22a to t23a.

In addition, in an embodiment, an inverted signal is synchronized with the nineteenth period t19a to t20a during an (N+2)th frame, i.e., to be synchronized with a jth horizontal synchronization signal of the (N+2)th frame. The inverted signal supplied during the (N+2)th frame cancels noise of the uplink signal supplied in the nineteenth period t19a to t20a during the (N+1)th frame.

As described above, in an embodiment of the present disclosure, the uplink signal and the inverted signal are alternately supplied in the frame unit, and hence the average noise can be reduced.

Specifically, in an embodiment, the noise generated by the nth uplink signal upl_n transmitted in the first period t1a to t2a of the Nth frame N-Frame shown in FIG. 9A is cancelled by the nth inverted signal iupl_n transmitted in the fifteenth period t15a to t16a of the (N+1)th frame N+1-Frame.

In addition, in an embodiment, referring to FIGS. 9A and 9B, at t1a of the Nth frame N-Frame, the nth uplink signal upl_n is transmitted when a horizontal synchronization signal is received. In addition, at t15a of the (N+1)th frame N+1-Frame, the nth inverted signal iupl_1 is transmitted when a horizontal synchronization signal is received. Accordingly, the noise generated by the nth uplink signal upl_n is more effectively cancelled by the nth inverted signal iupl_1.

Figure 10:
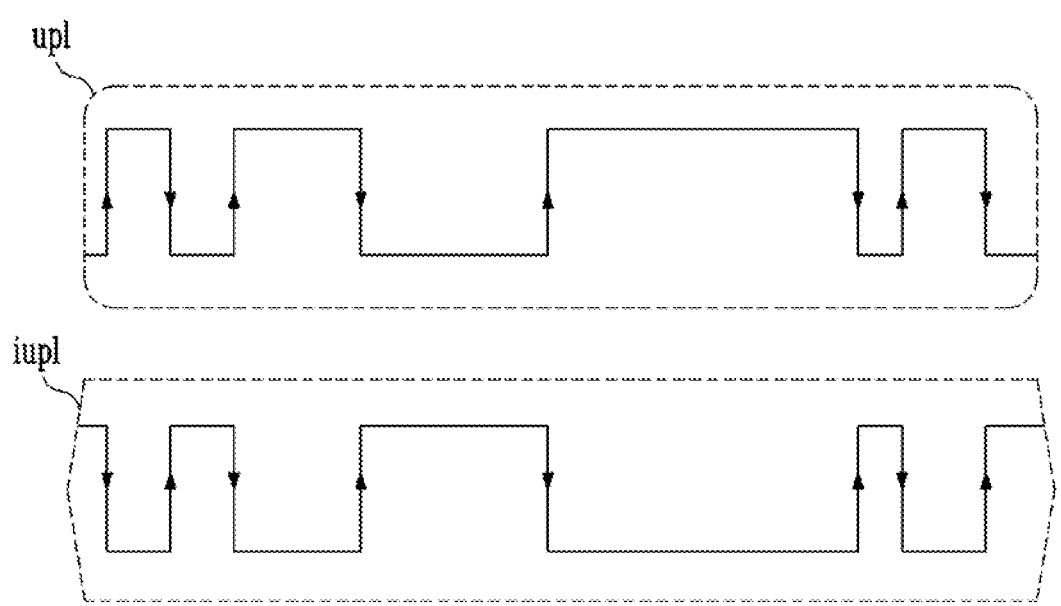
FIG. 10 illustrates transition directions of an uplink signal and an inverted signal in accordance with an embodiment of the present disclosure.

FIG. 10 illustrates transition directions of an uplink signal and an inverted signal in accordance with an embodiment of the present disclosure.

Referring to FIG. 10, in an embodiment, a transition direction of an inverted signal iupl is opposite to that of a corresponding uplink signal upl.

Specifically, in an embodiment, when the uplink signal upl has a rising transition, the inverted signal iupl has a falling transition. Conversely, when the uplink signal upl has a falling transition, the inverted signal iupl has a rising transition.

Accordingly, during the first period t1a to t2a of the Nth frame N-Frame shown in FIGS. 9A and 9B, noise caused by the nth uplink signal upl_n is cancelled by an (n−1)th inverted signal iupl_n−1 supplied during the fifth period t5a to t6a of the Nth frame N-Frame.

In addition, in an embodiment, during the first period t1a to t2a of the Nth frame N-Frame, noise of the nth uplink signal upl_n is cancelled by noise of the nth inverted signal iupl_n generated in the fifteenth period t15a to t16a of the (N+1)th frame N+1-Frame. Thus, display quality deterioration caused by the uplink signal can be prevented.

Hereinafter, a case where a protocol of the first object is changed in accordance with an embodiment of the present disclosure will be described with reference to FIGS. 11A and 11B.

Figure 11A:
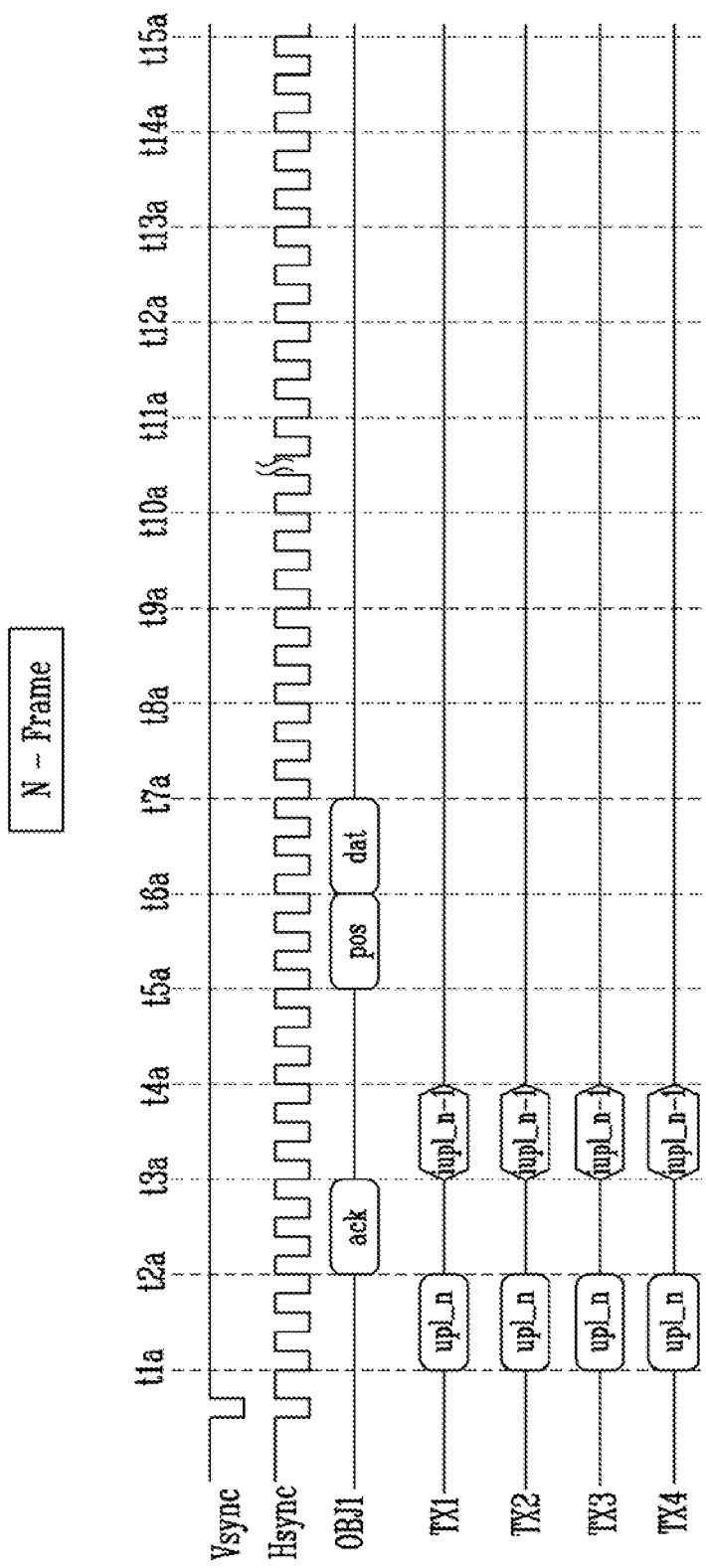
FIG. 11A illustrates a method for sensing a first object by using a different protocol in the Nth frame, in accordance with an embodiment of the present disclosure.

FIG. 11A illustrates a method for sensing the first object OBJ1 by using a different protocol in the Nth frame N-Frame, in accordance with an embodiment of the present disclosure. FIG. 11B illustrates a method for sensing the first object OBJ1 by using a different protocol in the (N+1)th frame N+1-Frame, in accordance with an embodiment of the present disclosure.

The above-described embodiments shown in FIGS. 8 to 10, assume a case where a protocol of the first object OBJ1 does not change.

Referring to FIGS. 9A and 9B, in an embodiment, when the existing protocol is used, a position signal pos is transmitted in the third period t3a to t4a of the Nth frame N-Frame. In addition, a position signal pos is transmitted in the twenty-first period t21a to t22a of the (N+1)th frame N+1-Frame.

That is, in an embodiment, the third period t3a to t4a in which the position of the first object OBJ1 is sensed in the Nth frame N-Frame and the twenty-first period t21a to t22a in which the position of the first object OBJ1 is sensed in the (N+1)th frame N+1-Frame have a difference of four time slots.

Figure 11B:
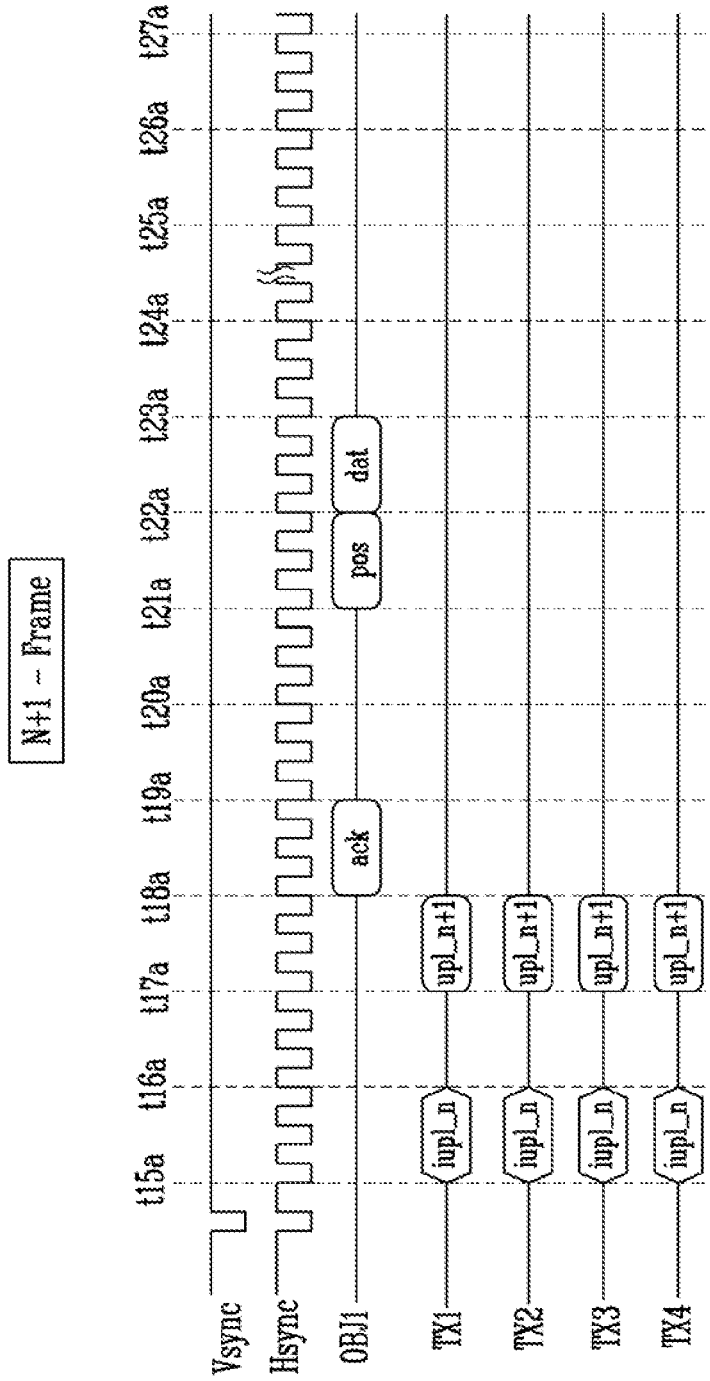
FIG. 11B illustrates a method for sensing a first object by using a different protocol in the (N+1)th frame, in accordance with an embodiment of the present disclosure.

However, FIGS. 11A and 11B illustrate an embodiment in which the protocol of the first object OBJ1 is modified such that two time slots are disposed between a transmission period of an acknowledge signal ack and a transmission period of a position signal pos in each of a plurality of frames Frame.

Specifically, in an embodiment, in FIG. 11A, at t1a of the Nth frame N-Frame, an nth uplink signal upl_n is synchronized with a horizontal synchronization signal. In addition, at t3 of the Nth frame N-Frame, an (n−1)th inverted signal iupl_n−1 is synchronized with the horizontal synchronization signal.

Referring to FIG. 11A, in an embodiment, during the first period t1a to t2a of the Nth frame N-Frame, the sensors TX1, TX2, TX3, and TX4 of the sensor unit 120 transmit the nth uplink signal upl_n.

In an embodiment, during the first period t1a to t2a of the Nth frame N-Frame, the first object OBJ1 receives the nth uplink signal upl_n. In response to the nth uplink signal upl_n, the first object OBJ1 transmits an acknowledge signal ack in a next time slot.

Therefore, in an embodiment, the sensors TX1, TX2, TX3, and TX4 receive the acknowledge signal ack with respect to the nth uplink signal upl_n during a second period t2a to t3a that is between the first period t1a to t2a and a third period t3a to t4a.

In addition, in an embodiment, the sensors TX1, TX2, TX3, and TX4 receive a position signal pos during a fifth period t5a to t6a. In addition, the sensors TX1, TX2, TX3, and TX4 further receive a data signal dat during a sixth period t6a to t7a.

In an embodiment, during the third period t3a to t4a of the Nth frame N-Frame, the sensors TX1, TX2, TX3, and TX4 of the sensor unit 120 transmit an (n−1)th inverted signal iupl_n−1 with respect to an (n−1)th uplink signal upl_n−1 of an (N−1)th frame N−1-Frame.

In an embodiment, a noise component caused by the nth uplink signal upl_n transmitted during the first period t1a to t2a of the Nth frame N-Frame can be cancelled by the (n−1)th inverted signal iupl_n−1 transmitted during the third period t3a to t4a of the Nth frame N-Frame.

In FIG. 11A, in an embodiment, the nth uplink signal upl_n is synchronized with the horizontal synchronization signal at t1a of the Nth frame N-Frame, and the (n−1)th inverted signal iupl_n−1 is synchronized with the horizontal synchronization signal at t3a of the Nth frame N-Frame. Thus, the noise component caused by the nth uplink signal upl_n transmitted during the first period t1a to t2a of the Nth frame N-Frame can be more effectively cancelled by the (n−1)th inverted signal iupl_n−1 transmitted during the third period t3a to t4a of the Nth frame N-Frame.

Referring to FIG. 11B, in an embodiment, at t15a of the (N+1)th frame N+1-Frame, an nth inverted signal iupl_n is synchronized with a horizontal synchronization signal. In addition, at t17a of the (N+1)th frame N+1-Frame, an (n+1)th uplink signal upl_n+1 is synchronized with the horizontal synchronization signal.

In addition, in an embodiment, during a fifteenth period t15a to t16a of the (N+1)th frame N+1-Frame, the sensors TX1, TX2, TX3, and TX4 of the sensor unit 120 transmit the nth inverted signal iupl_n.

In an embodiment, a noise component caused by the nth inverted signal iupl_n supplied in the fifteenth period t15a to t16a of the (N+1)th frame N+1-Frame is cancelled by the (n+1)th uplink signal upl_n+1 supplied in a seventeenth period t17a to t18a of the (N+1)th frame N+1-Frame.

In addition, in an embodiment, the first object OBJ1 does not receive a signal that has an inverted phase. Therefore, the first object OBJ1 cannot receive the nth inverted signal iupl_n during the fifteenth period t15a to t16a of the (N+1)th frame N+1-Frame.

In an embodiment, during the seventeenth period t17a to t18a of the (N+1)th frame N+1-Frame, the sensors TX1, TX2, TX3, and TX4 of the sensor unit 120 transmit the (n+1)th uplink signal upl_n+1.

In an embodiment, the object OBJ1 receives the (n+1)th uplink signal upl_n+1 during the seventeenth period t17a to t18a of the (N+1)th frame N+1-Frame. In response to the (n+1)th uplink signal upl_n+1, the first object OBJ1 transmits an acknowledge signal ack in a next time slot.

Therefore, in an embodiment, the sensors TX1, TX2, TX3, and TX4 receive the acknowledge signal ack with respect to the (n+1)th uplink signal upl_n+1 during an eighteenth period t18a to t19a.

In addition, in an embodiment, the sensors TX1, TX2, TX3, and TX4 further receive a data signal dat during a twenty-second period t22a to t23a.

Therefore, in an embodiment, the fifth period t5a to t6a in which a position of the first object OBJ1 is sensed in the Nth frame N-Frame and the twenty-first period t21a to t22a in which a position of the first object OBJ1 is sensed in the (N+1)th frame N+1-Frame have a difference of two time slots.

Consequently, in an embodiment, the protocol of the first object OBJ1 is modified such that two time slots are disposed between a transmission period of an acknowledge signal ack and a transmission period of a position signal pos in each of a plurality of frames Frame. Thus, the time slot difference between the fifth period t5a to t6a in which a position of the first object OBJ1 is sensed in the Nth frame N-Frame and the twenty-first period t21a to t22a in which a position of the first object OBJ1 is sensed in the (N+1)th frame N+1-Frame can be decreased.

In addition, in an embodiment, corresponding to the first object OBJ1, the noise component caused by the nth uplink signal up1_n generated in the first period t1a to t2a of the Nth frame N-Frame is cancelled by the noise component caused by the nth inverted signal iupl_n generated in the fifteenth period t15a to t16a of the (N+1)th frame N+1-Frame. Thus, display quality deterioration caused by the uplink signal can be prevented.

In addition, in an embodiment, like FIGS. 9A and 9B, a time at which the uplink signal is received and a time at which the horizontal synchronization signal is received correspond with each other.

Specifically, in an embodiment, at t1a of the Nth frame N-Frame, the nth uplink signal upl_n is transmitted when the horizontal synchronization signal is received. In addition, at t15a of the (N+1)th frame N+1-Frame, the nth inverted signal iupl_n is transmitted when the horizontal synchronization signal is received. Accordingly, noise generated by the nth uplink signal upl_n is more effectively cancelled by the nth inverted signal iupl_n.

Figure 12A:
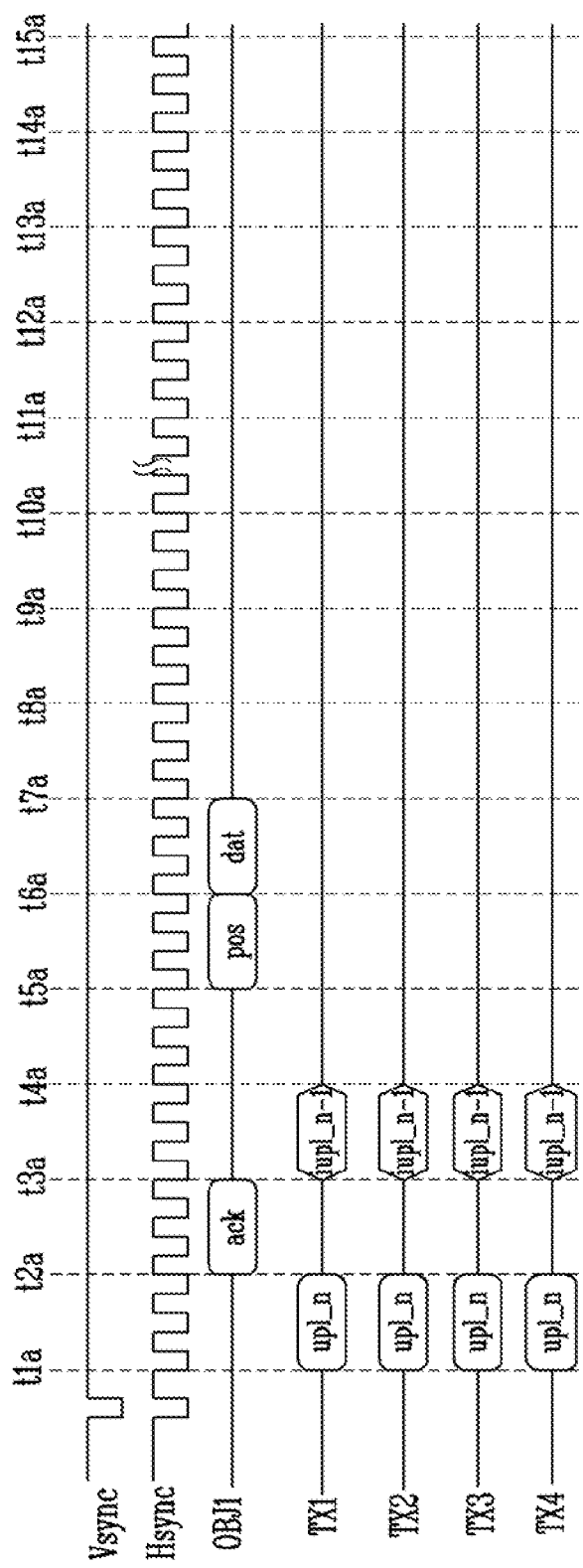
FIG. 12A illustrates a case where a protocol of a first object differs in the Nth frame in accordance with another embodiment of the present disclosure.
Figure 12B:
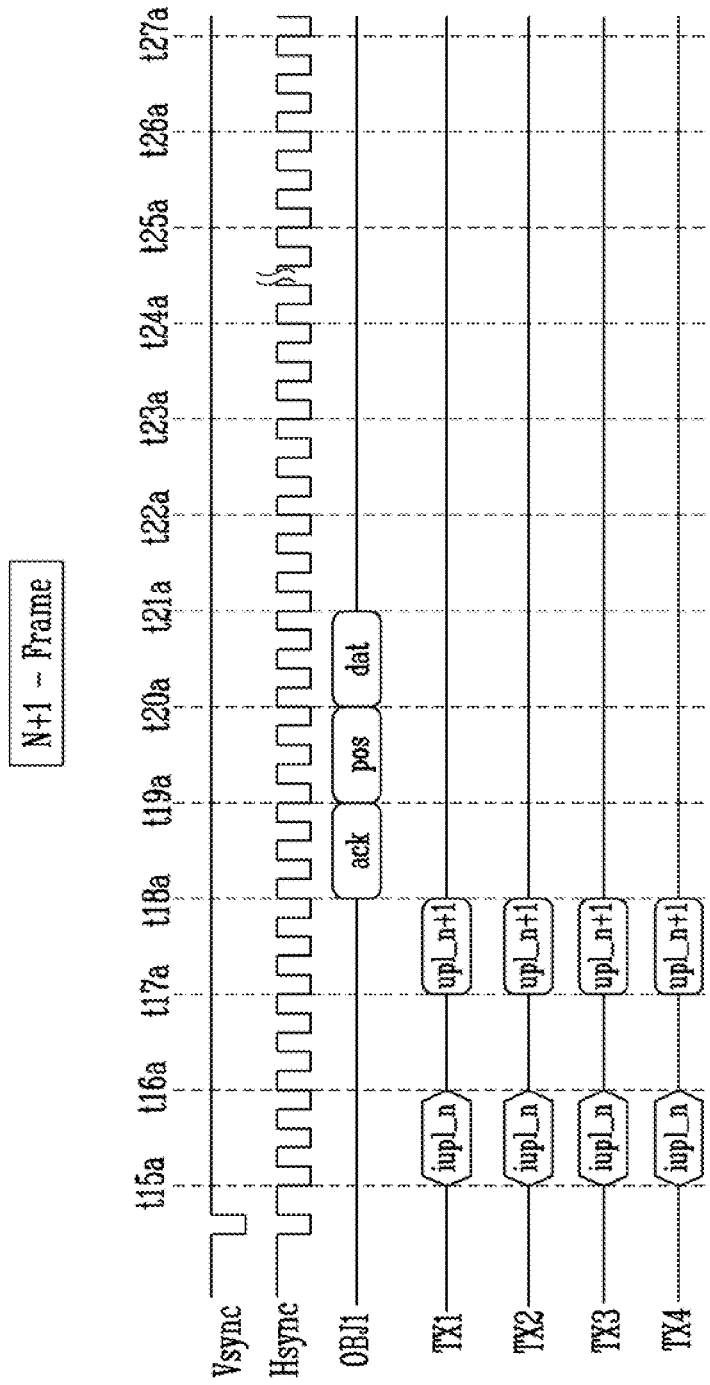
FIG. 12B illustrates a case where a protocol of a first object differs in the (N+1)th frame in accordance with another embodiment of the present disclosure.

FIG. 12A illustrates a case where the protocol of the first object differs in the Nth frame in accordance with another embodiment of the present disclosure. FIG. 12B illustrates a case where the protocol of the first object differs in the (N+1)th frame in accordance with another embodiment of the present disclosure.

Referring to FIGS. 12A and 12I, in an embodiment, a protocol of the first object OBJ1 with respect to the nth uplink signal upl_n of the N-th frame N-Frame differs from a protocol of the first object OBJ1 with respect to the (n+1)th uplink signal upl_n+1 of the (N+1)th frame N+1-Frame.

Referring to FIG. 11A, in an embodiment, in the second period t2a to t3a of the Nth frame N-Frame, the acknowledge signal ack is transmitted. In addition, in the fifth period t5a to t6a, the position signal pos is transmitted. Furthermore, in the sixth period t6a to t7a, the data signal dat is transmitted.

Referring to FIG. 11B, in an embodiment, in the eighteenth period t18a to t19a of the (N+1)th frame N+1-Frame, the acknowledge signal ack is transmitted. In addition, in the twenty-first period t21a to t22a, the position signal pos is transmitted. Furthermore, in the twenty-second period t22a to t23a, the data signal dat is transmitted.

That is, in an embodiment shown in FIGS. 11A and 11I, in the Nth frame N-Frame and the (N+1)th frame N+1-Frame, the time at which the first object OBJ1 transmits the acknowledge signal ack is transmitted and the time at which the position signal pos of the first object OBJ1 is transmitted have a difference of two time slots.

However, in accordance with the embodiment of the present disclosure, FIGS. 12A and 12B illustrate a case where, in the (N+1)th frame N+1-Frame, the protocol of the first object OBJ1 is modified such that a time slot of a transmission period of the position signal pos is a next a time slot after a transmission period of the acknowledge signal ack.

Referring to FIG. 12A, in an embodiment, during a first period t1a to t2a of the Nth frame N-Frame, the sensors TX1, TX2, TX3, and TX4 of the sensor unit 120 transmit an nth uplink signal upl_n.

In an embodiment, during the first period t1a to t2a of the Nth frame N-Frame, the first object OBJ1 receives the nth uplink signal upl_n. In response to the nth uplink signal upl_n, the first object OBJ1 transmits an acknowledge signal ack in a next time slot.

Therefore, in an embodiment, the sensors TX1, TX2, TX3, and TX4 receive the acknowledge signal ack with respect to the nth uplink signal upl_n during a second period t2a to t3a between the first period t1a to t2a and a third period t3a to t4a.

In addition, in an embodiment, the sensors TX1, TX2, TX3, and TX4 receive a position signal pos during a fifth period t5a to t6a, and the sensors TX1, TX2, TX3, and TX4 further receive a data signal dat during a sixth period t6a to t7a.

In an embodiment, during the third period t3a to t4a of the Nth frame N-Frame, the sensors TX1, TX2, TX3, and TX4 of the sensor unit 120 transmit an (n−1)th inverted signal iupl_n−1 with respect to an (n−1)th uplink signal upl_n−1 of an (N−1)th frame N−1-Frame.

Like FIGS. 9A and 9B, in an embodiment, a noise component caused by the nth uplink signal upl_n transmitted during the first period t1a to t2a of the Nth frame N-Frame is cancelled by the (n−1)th inverted signal iupl_n−1 transmitted during the third period t3a to t4a.

In addition, in an embodiment, like FIGS. 9A and 9B, at t1a of the Nth frame N-Frame, the nth uplink signal upl_n is transmitted when a horizontal synchronization signal is received. Furthermore, at t3a of the Nth frame N-Frame, the (n−1)th inverted signal iupl_n−1 is transmitted when the horizontal synchronization signal is received. Accordingly, noise generated by the nth uplink signal upl_n is more effectively cancelled by the (n−1)th inverted signal iupl_n−1.

Referring to FIG. 12B, in an embodiment, during a fifteenth period t15a to t16a of the (N+1)th frame N+1-Frame, the sensors TX1, TX2, TX3, and TX4 of the sensor unit 120 transmit an nth inverted signal iupl_n.

In an embodiment, the first object OBJ1 does not receive a signal that has an inverted phase. Therefore, the first object OBJ1 cannot receive the nth inverted signal iupl_n during the fifteenth period t15a to t16a of the (N+1)th frame N+1-Frame.

In an embodiment, during a seventeenth period t17a to t18a of the (N+1)th frame N+1-Frame, the sensors TX1, TX2, TX3, and TX4 of the sensor unit 120 transmit an (n+1)th uplink signal upl_n+1.

In an embodiment, the nth inverted signal iupl_n transmitted during the fifteenth period t15a to t16a of the (N+1)th frame N+1-Frame is cancelled by the (n+1)th uplink signal upl_n+1 transmitted during the seventeenth period t17a to t18a of the (N+1)th frame N+1-Frame.

In addition, in an embodiment, during seventeenth period t17a to t18a of the (N+1)th frame N+1-Frame, the first object OBJ1 receives the (n+1)th uplink signal upl_n+1. In response to the (n+1)th uplink signal upl_n+1, the first object OBJ1 transmits an acknowledge signal ack in a next time slot.

Therefore, in an embodiment, the sensors TX1, TX2, TX3, and TX4 receive the acknowledge signal ack with respect to the (n+1)th uplink signal upl_n+1 during an eighteenth period t18a to t19a.

In addition, in an embodiment, the sensors TX1, TX2, TX3, and TX4 further receive a position signal pos during a nineteenth period t19a to t20a.

In addition, in an embodiment, the sensors TX1, TX2, TX3, and TX4 further receive a data signal dat during a twentieth period t20a to t21a.

Therefore, in an embodiment, a sum of a period t2a to t7a in which the first object OBJ1 is sensed in the Nth frame N-Frame and a period t18a to t21a in which the position of the first object OBJ1 is sensed in the (N+1)th frame N+1-Frame is less than that of the period t2a to t7a in which the first object OBJ1 is sensed in the Nth frame N-Frame in accordance with the embodiment shown in FIGS. 11A and 11B and the period t18a to t23a in which the position of the first object OBJ1 is sensed in the (N+1)th frame N+1-Frame in accordance with the embodiment shown in FIGS. 11A and 11B. That is, the number of time slots can be reduced.

In addition, in an embodiment, corresponding to the first object OBJ1, the noise component caused by the nth uplink signal up1_n generated in the first period t1a to t2a of the Nth frame N-Frame is cancelled by the noise component caused by the nth inverted signal iupl_n generated in the fifteenth period t15a to t16a of the (N+1)th frame N+1-Frame. Thus, display quality deterioration caused by the uplink signal can be prevented.

In addition, in an embodiment, like FIGS. 9A and 9B, a time at which the uplink signal is received and a time at which the horizontal synchronization signal is received correspond with each other.

Specifically, in an embodiment, at t1a of the Nth frame N-Frame, the nth uplink signal upl_n is transmitted when the horizontal synchronization signal is received. In addition, at t15a of the (N+1)th frame N+1-Frame, the nth inverted signal iupl_n is transmitted when the horizontal synchronization signal is received. Accordingly, noise generated by the nth uplink signal upl_n is more effectively cancelled by the nth inverted signal iupl_n.

Hereinafter, a method for sensing the first object OBJ1 using a different protocol in accordance with another embodiment of the present disclosure will be described with reference to FIGS. 13A and 13B.

Figure 13A:
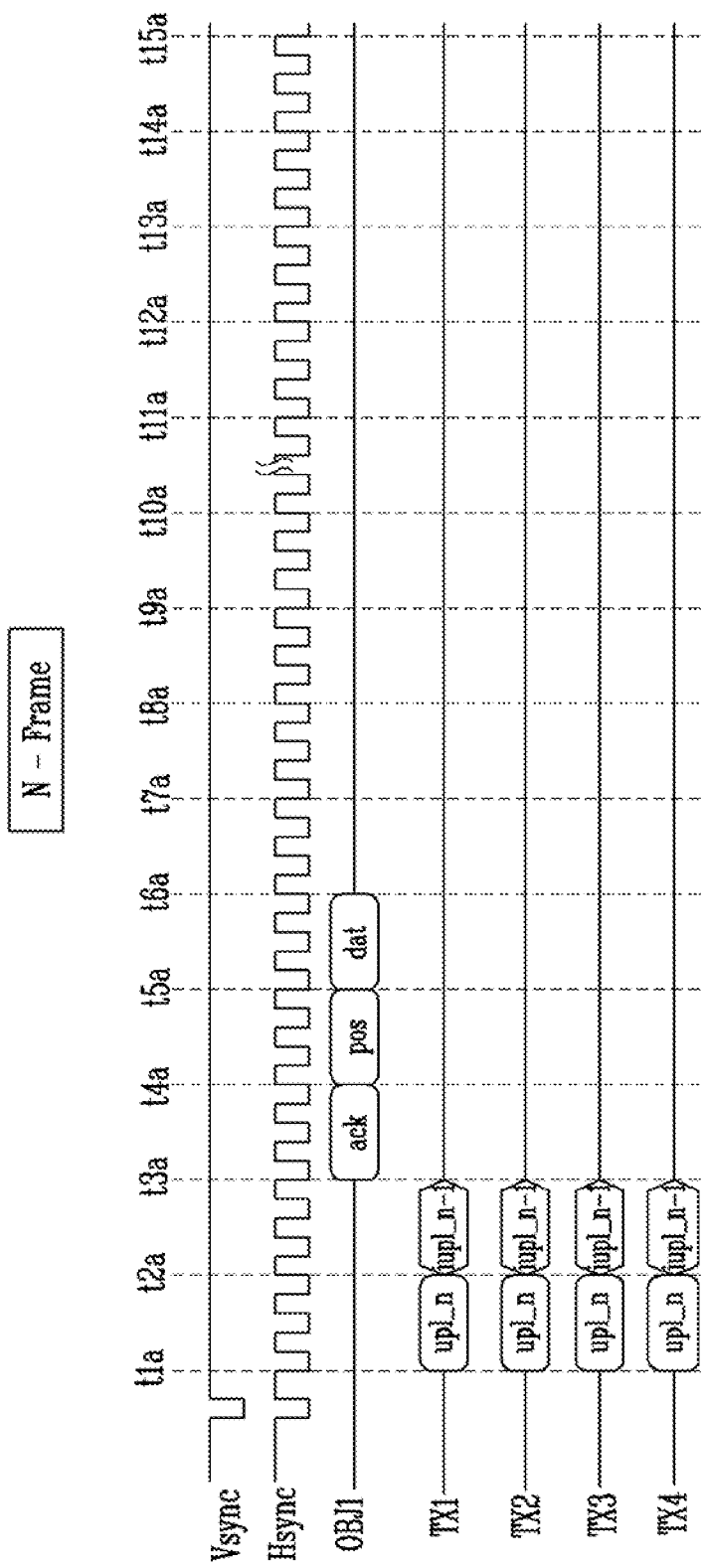
FIG. 13A illustrates a method for sensing a first object by using a different protocol in the Nth frame in accordance with another embodiment of the present disclosure.
Figure 13B:
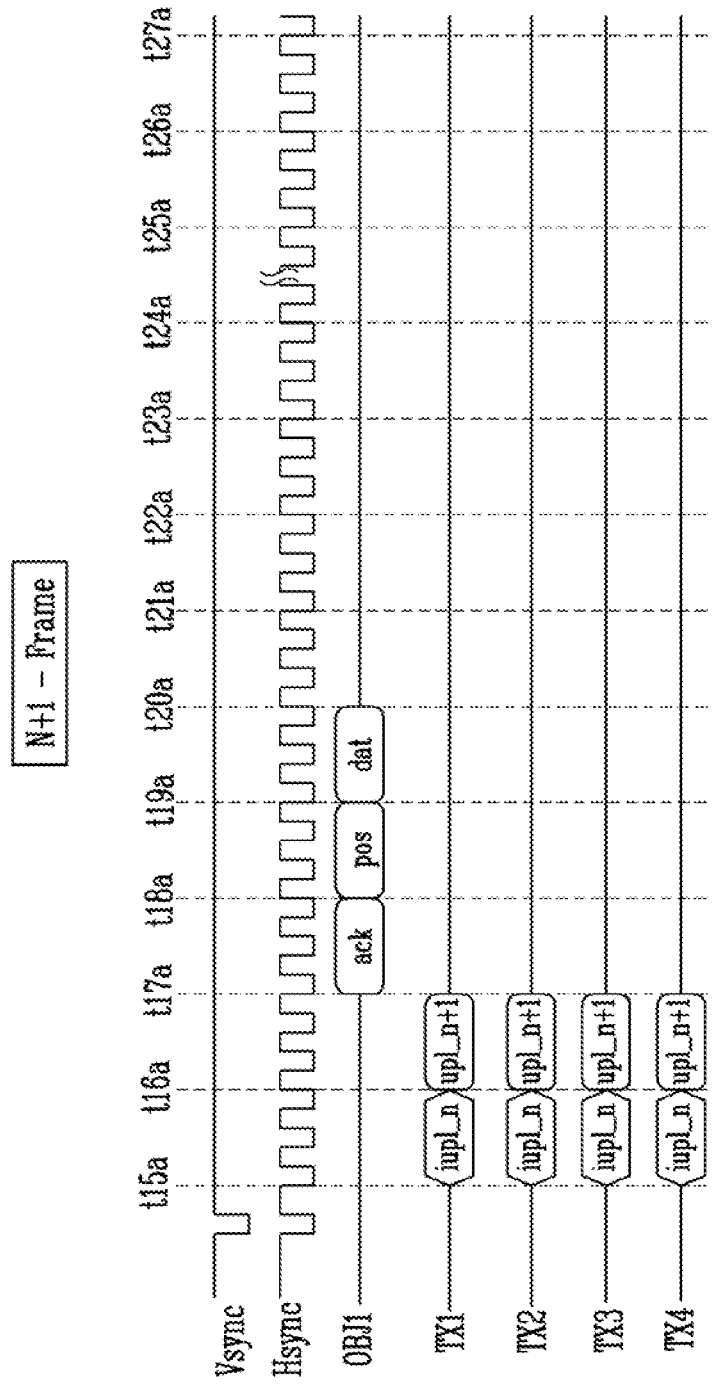
FIG. 13B Illustrates a method for sensing a first object by using a different protocol in the (N+1)th frame in accordance with another embodiment of the present disclosure.

FIG. 13A illustrates a method for sensing the first object using a different protocol in the Nth frame N-Frame in accordance with another embodiment of the present disclosure, FIG. 13B illustrates a method for sensing the first object using a different protocol in the (N+1)th frame N+1-Frame in accordance with another embodiment of the present disclosure.

Referring to FIG. 13A, in an embodiment, in Nth frame N-Frame, a protocol of the first object OBJ1 is set such that an acknowledge signal ack is transmitted in a third period t3a to t4a after a delay of one time slot t2a to t3a after an nth uplink signal upl_n is received, and an acknowledge signal ack is transmitted without a delay of any time slot after an (n−1)th inverted signal iupl_n−1 is received.

In an embodiment, a second period t2a to t3a of the (n−1)th inverted signal iupl_n−1 is a time slot that immediately follows a first period t1a to t2a of the nth uplink signal upl_n.

Like FIGS. 9A and 9B, in an embodiment, a noise component caused by the nth uplink signal upl_n transmitted during the first period t1a to t2a of the Nth frame N-Frame is cancelled by the (n−1)th inverted signal iupl_n−1 transmitted during the second period t2a to t3a.

Referring to FIG. 13A, in an embodiment, during the first period t1a to t2a of the Nth frame N-Frame, the sensors TX1, TX2, TX3, and TX4 of the sensor unit 120 transmit the nth uplink signal upl_n.

In an embodiment, during the first period t1a to t2a of the Nth frame N-Frame, the first object OBJ1 receives the nth uplink signal upl_n.

In an embodiment, during the second period t2a to t3a of the Nth frame N-Frame, the sensors TX1, TX2, TX3, and TX4 of the sensor unit 120 transmit an (n−1)th inverted signal iupl_n−1 with respect to an (n−1)th uplink signal upl_n−1 of an (N−1)th frame N−1-Frame.

In an embodiment, the first object OBJ1 transmits an acknowledge signal ack in a next time slot.

Therefore, in an embodiment, the sensors TX1, TX2, TX3, and TX4 receive the acknowledge signal ack with respect to the nth uplink signal upl_n during a third period t3a to t4a.

In addition, in an embodiment, the sensors TX1, TX2, TX3, and TX4 receive a position signal pos during a fourth period t4a to t5a.

In addition, in an embodiment, the sensors TX1, TX2, TX3, and TX4 further receive a data signal dat during a fifth period t5a to t6a.

Referring to FIG. 13B, in an embodiment, in the (N+1)th frame N+1-Frame, a protocol of the first object OBJ1 is set such that an (n+1)th uplink signal upl_n+1 is received after an nth inverted signal iupl_n is received, and an acknowledge signal ack is transmitted without delay of any time slot, corresponding to the (n+1)th uplink signal upl_n+1.

In an embodiment, a time slot t16a to t17a of the (n+1)th uplink signal upl_n+1 immediately follows a time slot t15a to t16a of the nth inverted signal iupl_n.

Like FIGS. 9A and 9B, in an embodiment, a noise component caused by the nth inverted signal iupl_n transmitted during a fifteenth period t15a to t16a of the (N+1)th frame N+1-Frame is cancelled by the nth uplink signal upl_n transmitted during a sixteenth period t16a to t17a.

Referring to FIG. 13B, in an embodiment, during the fifteenth period t15a to t16a of the (N+1)th frame N+1-Frame, the sensors TX1, TX2, TX3, and TX4 of the sensor unit 120 transmit the nth inverted signal iupl_n.

In an embodiment, the first object OBJ1 does not receive a signal that has an inverted phase. Therefore, the first object OBJ1 cannot receive the nth inverted signal iupl_n during the fifteenth period t15a to t16a of the (N+1)th frame N+1-Frame.

In an embodiment, during the sixteenth period t16a to t17a of the (N+1)th frame N+1-Frame, the sensors TX1, TX2, TX3, and TX4 of the sensor unit 120 transmit the (n+1)th uplink signal upl_n+1.

In an embodiment, during the sixteenth period t16a to t17a of the (N+1)th frame N+1-Frame, the first object OBJ1 receives the (n+1)th uplink signal upl_n+1. In response to the (n+1)th uplink signal upl_n+1, the first object OBJ1 transmits an acknowledge signal ack in a next time slot.

Therefore, in an embodiment, the sensors TX1, TX2, TX3, and TX4 receive the acknowledge signal ack with respect to the (n+1)th uplink signal upl_n+1 during a seventeenth period t17a to t18a.

In addition, in an embodiment, the sensors TX1, TX2, TX3, and TX4 further receive a position signal pos during an eighteenth period t18a to t19a. In addition, the sensors TX1, TX2, TX3, and TX4 further receive a data signal dat during a nineteenth period t19a to t20a.

In accordance with an embodiment shown in FIGS. 13A and 13B, in the Nth frame N-Frame, the acknowledge signal ack is transmitted one time slot after the first object OBJ1 receives the nth uplink signal upl_n. In addition, in the (N+1)th frame N+1-Frame, the acknowledge signal ack is transmitted in next time slot after the first object OBJ1 receives the (n+1)th uplink signal upl_n+1.

However, in accordance with an embodiment shown in FIGS. 12A and 12B, in the Nth frame N-Frame, the acknowledge signal ack is transmitted in a next time slot after the first object OBJ1 receives the nth uplink signal upl_n. In addition, in the (N+1)th frame N+1-Frame, the acknowledge signal ack is transmitted in a next time slot after the first object OBJ1 receives the (n+1)th uplink signal upl_n+1.

That is, in accordance with an embodiment shown in FIGS. 13A and 13B, when there is no time slot does between an uplink signal and an inverted signal, and a start signal of a frame Frame is the uplink signal, the first object OBJ1 transmits the acknowledge signal ack after an interval of one time slot. When the start signal of the frame Frame is the inverted signal, the first object OBJ1 transmits the acknowledge signal ack in the next time slot after the uplink signal is received. That is, the time slot in which the first object OBJ1 transmits the acknowledge signal ack can be adjusted.

However, in accordance with an embodiment shown in FIGS. 12A and 128, when there is a single time slot between an uplink signal and an inverted signal, the time at which the first object OBJ1 transmits the acknowledge signal ack is a next time slot after the uplink signal is received. Therefore, in an embodiment shown in FIGS. 12A and 12B, the time slot in which the first object OBJ1 transmits the acknowledge signal ack cannot be adjusted.

In addition, in an embodiment shown in FIGS. 13A and 135, the time slot in which the first object OBJ1 transmits the acknowledge signal ack can be adjusted, as compared with an embodiment shown in FIGS. 12A and 12B.

In addition, in an embodiment shown in FIGS. 13A and 13B, the number of time slots before sensing the first object OBJ1 can be further decreased, as compared with the embodiment shown in FIGS. 12A and 12B.

In addition, in an embodiment, the noise component caused by the nth uplink signal upl_n to the first object OBJ1 generated in the first period t1a to t2a of the Nth frame N-Frame id cancelled by the noise component caused by the nth inverted signal iupl_n generated in the fifteenth period t15a to t16a of the (N+1)th frame N+1-Frame. Thus, display quality deterioration caused by the uplink signal can be prevented.

In addition, in an embodiment, like FIGS. 9A and 9B, at t1a of the Nth frame N-Frame, the nth uplink signal upl_n is transmitted when the horizontal synchronization signal is received. In addition, at t15a of the (N+1)th frame N+1-Frame, the nth inverted signal iupl_n is transmitted when the horizontal synchronization signal is received. Accordingly, noise generated by the nth uplink signal upl_n is more effectively cancelled by the nth inverted signal iupl_n.

Hereinafter, a method for sensing the first object in accordance with another embodiment of the present disclosure will be described with reference to FIGS. 14A and 148.

Figure 14A:
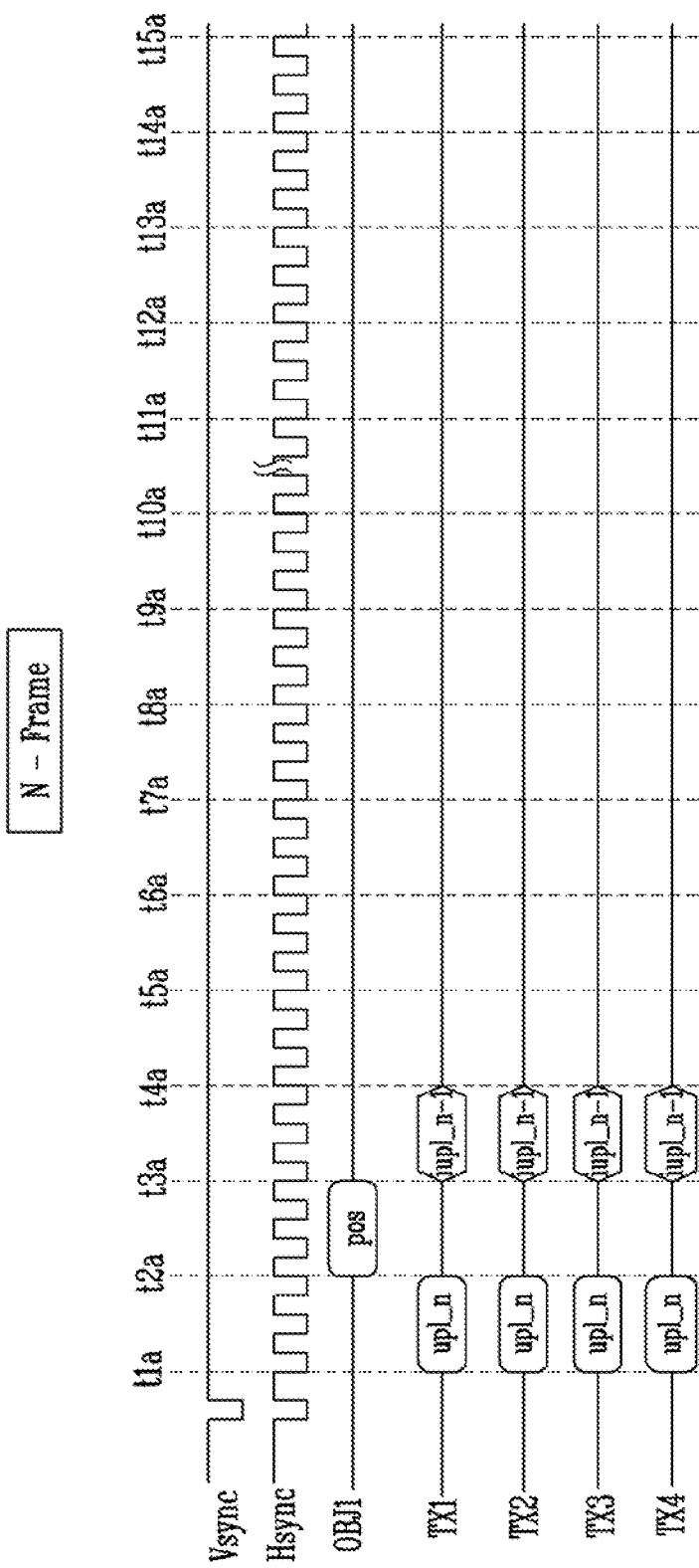
FIG. 14A illustrates a method for sensing a first object in the Nth frame in accordance with another embodiment of the present disclosure.
Figure 14B:
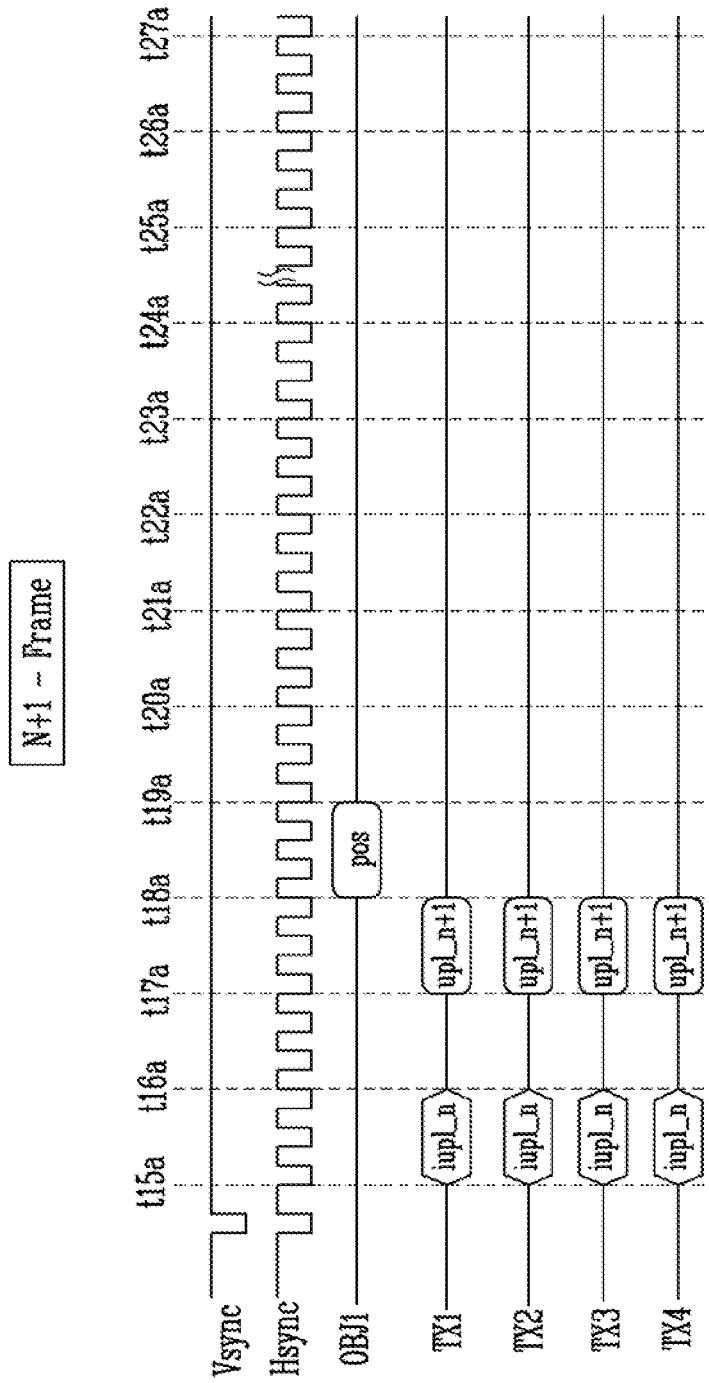
FIG. 14B illustrates a method for sensing a first object in the (N+1)th frame in accordance with another embodiment of the present disclosure.

FIG. 14A Illustrates a method for sensing the first object OBJ1 in the Nth frame N-Frame in accordance with another embodiment of the present disclosure. FIG. 14B illustrates a method for sensing the first object OBJ1 in the (N+1)th frame N+1-Frame in accordance with another embodiment of the present disclosure.

In an embodiment, the first object OBJ1 communicates with the display device 1 by using another wireless communication, such as Bluetooth. Data transmission/reception that corresponds to an acknowledge signal ack and a data signal dat is performed using Bluetooth, etc., and therefore, it is sufficient that the first object OBJ1 generates only a position signal pos with respect to the sensor unit 120.

Referring to FIG. 14A, in an embodiment, during a first period t1a to t2a of the Nth frame N-Frame, the sensors TX1, TX2, TX3, and TX4 of the sensor unit 120 transmit an nth uplink signal upl_n.

In an embodiment, during the first period t1a to t2a of the Nth frame N-Frame, the first object OBJ1 receives the nth uplink signal upl_n. In response to the nth uplink signal upl_n, the first object OBJ1 transmits a position signal pos in a next time slot.

Therefore, in an embodiment, the sensors TX1, TX2, TX3, and TX4 receive the position signal pos with respect to the nth uplink signal upl_n during a second period t2a to t3a that is between the first period t1a to t2a and a third period t3a to t4a.

In an embodiment, during the third period t3a to t4a of the Nth frame N-Frame, the sensors TX1, TX2, TX3, and TX4 of the sensor unit 120 transmit an (n−1)th inverted signal iupl_n−1 with respect to an (n−1)th uplink signal upl_n−1 of an (N−1)th frame N−1-Frame.

Like FIGS. 9A and 95, in an embodiment, a noise component caused by the nth uplink signal upl_n transmitted during the first period t1a to t2a of the Nth frame N-Frame is cancelled by the (n−1)th inverted signal iupl_n−1 transmitted during the third period t2a to t3a.

Referring to FIG. 14B, in an embodiment, during a fifteenth period t15a to t16a of the (N+1)th frame N+1-Frame, the sensors TX1, TX2, TX3, and TX4 of the sensor unit 120 transmit an nth inverted signal iupl_n.

In an embodiment, the first object OBJ1 does not receive a signal that has an inverted phase. Therefore, during the fifteenth period t15a to t16a of the (N+1)th frame N+1-Frame, the first object OBJ1 cannot receive the nth inverted signal iupl_n.

Like FIGS. 9A and 9B, in an embodiment, a noise component caused by the nth inverted signal iupl_n transmitted during the fifteenth period t15a to t16a of the (N+1)th frame N+1-Frame is cancelled by the nth uplink signal upl_n transmitted during a seventeenth period t17a to t18a.

In an embodiment, during the seventeenth period t17a to t18a of the (N+1)th frame N+1-Frame, the first object OBJ1 receives an (n+1)th uplink signal upl_n+1. In response to the (n+1)th uplink signal upl_n+1, the first object OBJ1 transmits a position signal pos in a next time slot.

Therefore, in an embodiment, the sensors TX1, TX2, TX3, and TX4 receive the position signal pos with respect to the (n+1)th uplink signal upl_n+1 during an eighteenth period t18a to t19a.

As shown in FIGS. 14A and 14B, in an embodiment, the first object OBJ1 generates only the position signal pos, and the noise component caused by the nth uplink signal upl_n generated in the first period t1a to t2a of the Nth frame N-Frame is cancelled by the noise component caused by the nth inverted signal iupl_n generated in the fifteenth period t15a to t16a of the (N+1)th frame N+1-Frame. Thus, display quality deterioration caused by the uplink signal can be prevented.

In addition, like FIGS. 9A and 9B, in an embodiment, at t1a of the Nth frame N-Frame, the nth uplink signal upl_n is transmitted when the horizontal synchronization signal is received. In addition, at t15a of the (N+1)th frame N+1-Frame, the nth inverted signal iupl_n is transmitted when the horizontal synchronization signal is received. Accordingly, noise generated by the nth uplink signal upl_n is more effectively cancelled by the nth inverted signal iupl_n.

In a display device and a driving method thereof in accordance with embodiments of the present disclosure, display quality deterioration due to transmission of an uplink signal can be prevented.

Embodiments have been disclosed herein, and although specific terms are employed, they are used and are to be interpreted in a generic and descriptive sense only and not for purpose of limitation in some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of embodiments of the present disclosure as set forth in the following claims.

What is claimed is:

1. A display device, comprising:
   a display unit that displays an image during a plurality of frames; and
   a sensor unit that overlaps the display unit, wherein the sensor unit includes a plurality of sensors,
   wherein, during a first period of an Nth frame of the plurality of frames, the plurality of sensors transmit a first signal, and wherein N is a positive integer,
   wherein, during a second period of the Nth frame, the plurality of sensors transmit a second signal, wherein the second period follows the first period,
   wherein, during a third period of an (N+1)th frame of the plurality of frames, the plurality of sensors transmit a third signal,
   wherein, during a fourth period of the (N+1)th frame, the plurality of sensors transmit a fourth signal, wherein the fourth period follows the third period, and wherein the first signal and the third signal have phases opposite to each other,
   wherein:
   each of the Nth frame and the (N+1)th frame comprises a number of sequential, horizontal periods synchronized with a horizontal synchronization signal, and the number of the horizontal periods is greater than 2;
   a first horizontal period of the horizontal periods of the Nth frame comprises the first period, a second horizontal period of the horizontal periods of the Nth frame comprises the second period, and at least one of the horizontal periods of the Nth frame is provided between the first and second horizontal periods of the horizontal periods of the Nth frame;
   a first horizontal period of the horizontal periods of the (N+1)th frame comprises the third period, and a second horizontal period of the horizontal periods of the (N+1)th frame comprises the fourth period;
   wherein the first period starts when an ith horizontal synchronization signal is received in the Nth frame, wherein i is a natural number,
   the third period starts when an ith horizontal synchronization signal is received in the (N+1)th frame,
   the second period starts when a jth horizontal synchronization signal is received in the Nth frame, wherein j is a natural number greater than i, and
   the fourth period starts when a jth horizontal synchronization signal is received in the (N+1)th frame;
   wherein the first signal is an Nth uplink signal, and the second signal is an (N−1)th inverted signal, and
   the third signal is an Nth inverted signal, and the fourth signal is an (N+1)th uplink signal.

2. The display device of claim 1, wherein at least some of the plurality of sensors:
   receive an acknowledge signal with respect to the first signal during a fifth period between the first period and the second period;
   receive a position signal with respect to the first signal during a sixth period between the first period and the second period; and
   receive a data signal with respect to the first signal during a seventh period between the first period and the second period, and
   wherein the sixth period comes after the fifth period, and the seventh period comes after the sixth period.

3. The display device of claim 2, wherein at least some of the plurality of sensors:
   receive an acknowledge signal with respect to the fourth signal during an eighth period after the fourth period;
   receive a position signal with respect to the fourth signal during a ninth period after the fourth period; and
   receive a data signal with respect to the fourth signal during a tenth period after the fourth period, and
   wherein the ninth period comes after the eight period, and the tenth period comes after the ninth period.

4. The display device of claim 1, wherein at least some of the plurality of sensors:
   receive an acknowledge signal with respect to the first signal during a fifth period between the first period and the second period;
   receive a position signal with respect to the first signal during a sixth period after the second period; and
   receive a data signal with respect to the first signal during a seventh period after the second period, and
   wherein the seventh period comes after the sixth period.

5. The display device of claim 4, wherein at least some of the plurality of sensors:
   receive an acknowledge signal with respect to the fourth signal during an eighth period after the fourth period;
   receive a position signal with respect to the fourth signal during a ninth period after the fourth period; and
   receive a data signal with respect to the fourth signal during a tenth period after the fourth period, and
   wherein the ninth period comes after the eighth period, and
   the tenth period comes after the ninth period.

6. The display device of claim 1, wherein at least some of the plurality of sensors:
   receive an acknowledge signal with respect to the first signal during a fifth period after the second period;
   receive a position signal with respect to the first signal during a sixth period after the second period; and receive a data signal with respect to the first signal during a seventh period after the second period, and wherein the sixth period comes after the fifth period, and the seventh period comes after the sixth period.

7. The display device of claim 6, wherein at least some of the plurality of sensors:

receive an acknowledge signal with respect to the fourth signal during an eighth period after the fourth period;

receive a position signal with respect to the fourth signal during a ninth period after the fourth period; and receive a data signal with respect to the fourth signal during a tenth period after the fourth period, and wherein the ninth period comes after the eighth period, and the tenth period comes after the ninth period.

8. The display device of claim 3, wherein at least some of the plurality of sensors:

receive a position signal with respect to the first signal between the first period and the second period; and receive a position signal with respect to the fourth signal after the fourth period, and wherein the first signal and the fourth signal are the same.

9. A method for driving a display device, the method comprising:

transmitting, by a sensor unit, a first signal during a first period of an Nth frame of a plurality of frames in which an image is displayed by a display unit, wherein N is a positive integer;

transmitting, by the sensor unit, a second signal during a second period of the Nth frame, wherein the second period follows the first period;

transmitting, by the sensor unit, a third signal during a third period of an (N+1)th frame of the plurality of frames; and transmitting, by the sensor unit, a fourth signal during a fourth period of the (N+1)th frame, wherein the fourth period follows the third period, wherein the first signal and the third signal have phases opposite to each other, wherein:

each of the Nth frame and the (N+1)th frame comprises a number of sequential, horizontal periods synchronized with a horizontal synchronization signal, and the number of the horizontal periods is greater than 2:

a first horizontal period of the horizontal periods of the Nth frame comprises the first period, a second horizontal period of the horizontal periods of the Nth frame comprises the second period, and at least one of the horizontal periods of the Nth frame is provided between the first and second horizontal periods of the horizontal periods of the Nth frame;

a first horizontal period of the horizontal periods of the (N+1)th frame comprises the third period, and a second horizontal period of the horizontal periods of the (N+1)th frame comprises the fourth period;

wherein the first period starts when an ith horizontal synchronization signal is received in the Nth frame, wherein i is a natural number, the third period starts when an ith horizontal synchronization signal is received in the (N+1)th frame, the second period starts when a jth horizontal synchronization signal is received in the Nth frame, wherein j is a natural number greater than i, and the fourth period starts when a jth horizontal synchronization signal is received in the (N+1)th frame;

wherein the first signal is an Nth uplink signal, and the second signal is an (N−1)th inverted signal, and the third signal is an Nth inverted signal, and the fourth signal is an (N+1)th uplink signal.

10. The method of claim 9, wherein transmitting the first signal during the first period of the Nth frame further includes:

receiving an acknowledge signal with respect to the first signal during a fifth period between the first period and the second period;

receiving a position signal with respect to the first signal during a sixth period between the first period and the second period; and receiving a data signal with respect to the first signal during a seventh period between the first period and the second period, and wherein the sixth period comes after the fifth period, and the seventh period comes after the sixth period.

11. The method of claim 10, wherein transmitting the fourth signal during the fourth period of the (N+1)th frame further includes:

receiving an acknowledge signal with respect to the fourth signal during an eighth period after the fourth period;

receiving a position signal with respect to the fourth signal during a ninth period after the fourth period; and receiving a data signal with respect to the fourth signal during a tenth period after the fourth period, and wherein the ninth period comes after the eight period, and the tenth period comes after the ninth period.

12. The method of claim 9, wherein transmitting the first signal during the first period of the Nth frame further includes receiving an acknowledge signal with respect to the first signal during a fifth period between the first period and the second period, wherein transmitting the second signal during the second period of the Nth frame further includes:

receiving a position signal with respect to the first signal during a sixth period after the second period; and receiving a data signal with respect to the first signal during a seventh period after the second period, and wherein the seventh period comes after the sixth period.

13. The method of claim 12, wherein transmitting the fourth signal during the fourth period of the (N+1)th frame further includes:

receiving an acknowledge signal with respect to the fourth signal during an eighth period after the fourth period;

receiving a position signal with respect to the fourth signal during a ninth period after the fourth period; and receiving a data signal with respect to the fourth signal during a tenth period after the fourth period, and wherein the ninth period comes after the eighth period, and the tenth period comes after the ninth period.

14. The method of claim 9, wherein transmitting the second signal during the second period of the Nth frame further includes:

receiving an acknowledge signal with respect to the first signal during a fifth period after the second period;

receiving a position signal with respect to the first signal during a sixth period after the second period; and receiving a data signal with respect to the first signal during a seventh period after the second period, and wherein the sixth period comes after the fifth period, and the seventh period comes after the sixth period.

15. The method of claim 14, wherein transmitting the fourth signal during the fourth period of the (N+1)th frame further includes:

receiving an acknowledge signal with respect to the fourth signal during an eighth period after the fourth period;

receiving a position signal with respect to the fourth signal during a ninth period after the fourth period; and receiving a data signal with respect to the fourth signal during a tenth period after the fourth period, and wherein the ninth period comes after the eighth period, and the tenth period comes after the ninth period.

16. The method of claim 9, wherein transmitting the first signal during the first period of the Nth frame further includes receiving a position signal with respect to the first signal between the first period and the second period, wherein transmitting the fourth signal during the fourth period of the (N+1)th frame further includes receiving a position signal with respect to the fourth signal after the fourth period, and wherein the first signal and the fourth signal are the same.

* * * * *